United States Patent
Motoyoshi et al.

(10) Patent No.: US 8,293,861 B2
(45) Date of Patent: Oct. 23, 2012

(54) OPTICAL FILM

(75) Inventors: Tetsuya Motoyoshi, Tokyo (JP);
Masatoshi Ando, Tokyo (JP); Akiko Washizu, Tokyo (JP)

(73) Assignee: Teijin Chemicals Ltd., Tokyo (JP)

( * ) Notice: Subject to any disclaimer, the term of this patent is extended or adjusted under 35 U.S.C. 154(b) by 0 days.

(21) Appl. No.: 13/152,652

(22) Filed: Jun. 3, 2011

(65) Prior Publication Data

US 2011/0288261 A1    Nov. 24, 2011

Related U.S. Application Data

(63) Continuation-in-part of application No. PCT/JP2009/070446, filed on Dec. 1, 2009.

(30) Foreign Application Priority Data

Dec. 5, 2008   (JP) ................ 2008-310734
Mar. 26, 2009  (JP) ................ 2009-076412

(51) Int. Cl.
  *C08G 64/00* (2006.01)
  *C08G 63/02* (2006.01)

(52) U.S. Cl. ............ 528/196; 264/176.1; 264/219; 359/109; 359/642; 528/176; 528/193; 528/194; 528/271; 528/272

(58) Field of Classification Search ......... 264/176.1, 264/219; 359/109, 642; 528/176, 193, 194, 528/196, 198, 271, 272
See application file for complete search history.

(56) References Cited

FOREIGN PATENT DOCUMENTS

| | | |
|---|---|---|
| JP | 2000-169573 | 6/2000 |
| JP | 3325560 | 7/2002 |
| JP | 2002-293911 | 10/2002 |
| JP | 2002-308978 | 10/2002 |
| JP | 2003-090901 | 3/2003 |
| JP | 2003-090917 | 3/2003 |
| JP | 2003-128609 | 5/2003 |
| JP | 2004-67990 | 3/2004 |
| JP | 2005-31610 | 2/2005 |
| JP | 2010-261008 | 11/2010 |
| WO | 01/32745 | 5/2001 |
| WO | 2006/041190 | 4/2006 |
| WO | 2010/061926 | 6/2010 |

OTHER PUBLICATIONS

Macromolecules 2007, 40, (15), 5284-5289, Kawasaki, S et al.*
Macromolecules, 2010, 43 (1), pp. 131-136 Toshihide, H et al.*
International Search Report dated Mar. 16, 2010 issued in International (PCT) Application PCT/JP2009/070446 corresponding to present US Application.
International Preliminary Report on Patentability issued Jul. 5, 2011 issued in International (PCT) Application PCT/JP2009/070446 corresponding to present US Application.
English abstract of JP 02-120804 published May 8, 1990.
English abstract of WO 01/09649 published Feb. 8, 2001.
English abstract of JP 2006-323254 published Nov. 30, 2006.
English abstract of JP 3995387 published Aug. 10, 2007.
English abstract of WO 2009/075304 published Jun. 18, 2009.
Japanese Office Action issued Jun. 5, 2012 in corresponding Japanese Application No. 2012-021755, with English translation thereof.

* cited by examiner

*Primary Examiner* — Terressa Boykin
(74) *Attorney, Agent, or Firm* — Wenderoth, Lind & Ponack, L.L.P.

(57) ABSTRACT

An optical film comprising a copolycarbonate composed of 25 to 90 mol % of unit (A) of the following formula,

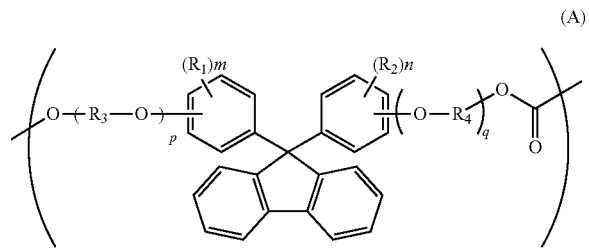

and 10 to 75 mol % of unit (B) of the following formula,

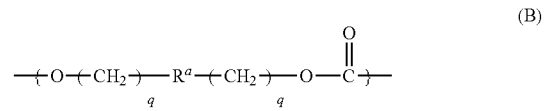

wherein the substituents are defined herein, and the optical film satisfies the following expression (1), R(450)<R(550)<R(650) (1), wherein R(450), R(550) and R(650) are in-plane retardation values of the film at wavelengths of 450 nm, 550 nm and 650 nm. The optical film exhibits a desired chromatic dispersion, low photoelasticity and excellent melt processability.

5 Claims, No Drawings

OPTICAL FILM

This Application is a Continuation-in-part Application of International Application No. PCT/JP2009/070446 filed Dec. 1, 2009.

TECHNICAL FIELD

This invention relates to an optical film. More specifically, it relates to an optical film having a desired chromatic dispersion, having a low photoelastic constant and high heat resistance and having excellent melt processability.

BACKGROUND ART

An optical film is used as a retardation film or a protective film for a polarizing plate. The retardation film is used in a liquid crystal display, and has functions of color compensation, broadening of a viewing angle and prevention of reflection. As a retardation film, a λ/4 film and a λ/2 film are known, and a polycarbonate, a polyether sulfone and a polysulfone are used as materials therefor. λ/4 films and λ/2 films formed from these materials have the property of having a larger phase difference as the wavelength gets shorter. There is hence involved a problem that the wavelength capable of functioning as a λ/4 film and a λ/2 film is limited to specific wavelengths.

As a method of controlling a wavelength in a broad band, there is known a method of stacking two or more birefringence films having different dependency of phase difference on wavelength at specific angles (Patent Document 1). This method requires the steps of attaching a plurality of retardation films and adjusting attaching angles and hence has a problem on productivity. Further, since the thickness of the entire retardation films is increased, there is involved a problem that the light transmittance is decreased to get dark.

In recent years, there is proposed a method of controlling a wavelength in a broad band by means of one film without stacking (Patent Document 2). That is a method using a copolycarbonate composed of a unit having positive refractivity anisotropy and a unit having negative refractivity anisotropy. However, this copolycarbonate has a high melting temperature since it contains a unit derived from fluorene-based bisphenol, and there is involved a problem that a gel substance formed by decomposition is liable to be generated when it melted. Further, it has a high glass transition temperature (Tg) and requires a high temperature for film stretching, and it requires an unconventional special processing apparatus. Further, it has a high photoelastic constant and has a large birefringence due to a stress, and it has a problem that a light omission takes place when it is used as a retardation film.

On the other hand, there is already proposed a low-photoelastic-constant copolycarbonate formed from an aliphatic diol to be used for an optical disc (Patent Document 3). In this document, however, nothing has been studied with regard to the stretchability of the film and the chromatic dispersion. Further, the photoelastic constant of the copolycarbonate described in this document is required to be further decreased when it is used as a retardation film or a protective film for a polarizing plate.

Further, there is reported a low-photoelastic-constant retardation film formed from a copolycarbonate containing a fluorene component and an isosorbide component (Patent Document 4). Since this copolycarbonate is a termpolymer, it is required to precisely control the compositional ratio of three components for controlling the chromatic dispersion, and its stable production is not easy. Further, since it has low thermal stability, it has a defect that its molecular weight is liable to be decreased during melt-processing.

There is also proposed a retardation film formed from a copolycarbonate containing a fluorene-based bisphenol structure (Patent Documents 5 and 6). Further, there is also proposed a polarizing plate protective film formed from a copolycarbonate containing a fluorene-based bisphenol structure (Patent Document 7). However, any one of these has a high glass transition temperature (Tg), and a high temperature is required for stretching a film, so that an unconventional special processing apparatus is required. Further, they have high photoelastic constants and large birefringence due to a stress, and they have a problem that a light omission takes place when they are used as retardation films.

(Patent Document 1) JP-A 2-120804
(Patent Document 2) Japanese Patent No. 3325560
(Patent Document 3) JP-A 2004-67990
(Patent Document 4) International Publication No. 06/041190
(Patent Document 5) International Publication No. 01/009649
(Patent Document 6) JP-A 2006-323254
(Patent Document 7) Japanese Patent No. 3995387

DISCLOSURE OF THE INVENTION

It is an object of this invention to provide an optical film formed of a copolycarbonate having a desired chromatic dispersion and having low photoelasticity and excellent melt processability.

The present inventor has made diligent studies and found that an optical film comprising a copolycarbonate of a diol having a fluorene structure in a side chain with a specific aliphatic diol exhibits an inverse chromatic dispersion of a phase difference being smaller with a decrease in wavelength and has a low photoelastic constant and excellent melt processability, and this invention has been accordingly arrived at.

That is, this invention is an optical film comprising a copolycarbonate composed of 25 to 90 mol % of unit (A) of the following formula,

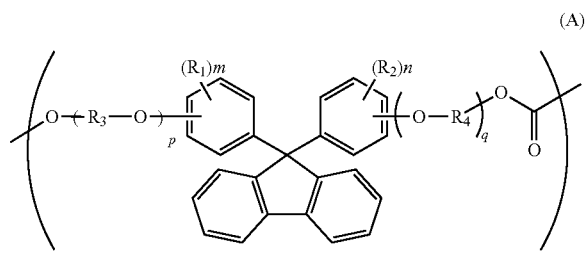

wherein each of $R_1$ and $R_2$ is independently a hydrogen atom, a hydrocarbon group having 1 to 10 carbon atoms or a halogen atom, each of $R_3$ and $R_4$ is independently a hydrocarbon group having 1 to 10 carbon atoms, each of m and n is independently an integer of 0 to 4, and each of p and q is independently an integer of 0 or more, and 10 to 75 mol % of unit (B) of the following formula

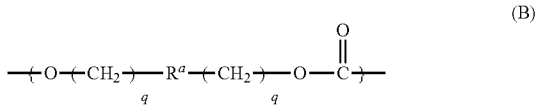

(B)

wherein $R^a$ is a monocyclic or polycyclic alicyclic hydrocarbon group having 4 to 20 carbon atoms, the alicyclic hydrocarbon group may contain a hetero atom or may have a bridge structure, and q is 0 or 1, the optical film satisfying the following expression (1), $$R(450)<R(550)<R(650) \quad (1)$$

wherein R(450), R(550) and R(650) are in-plane retardation values of the film at wavelengths of 450 nm, 550 nm and 650 nm, respectively.

The optical film of this invention can be used as a retardation film. This invention also includes a liquid crystal display provided with the above retardation film.

PREFERRED EMBODIMENTS OF THE INVENTION

This invention will be explained in detail below. The optical film of this invention comprises a copolycarbonate composed of unit (A) and unit (B).

(Unit (A))

The unit (A) is represented by the following formula.

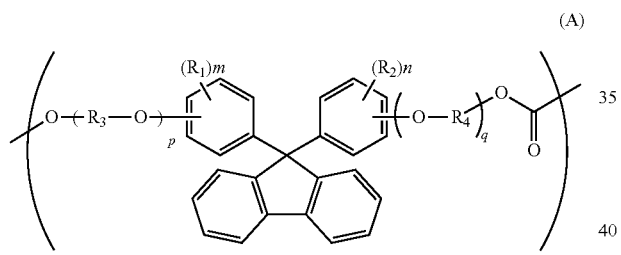

(A)

In the unit (A), each of $R_1$ and $R_2$ is independently a hydrogen atom, a hydrocarbon group having 1 to 10 carbon atoms or a halogen atom. The hydrocarbon group includes an alkyl group having 1 to 10 carbon atoms, a cycloalkyl group having 5 to 10 carbon atoms, an aryl group having 6 to 10 carbon atoms, an aralkyl group having 7 to 10 carbon atoms and an alkenyl group having 1 to 10 carbon atoms. The alkyl group having 1 to 10 carbon atoms includes methyl, ethyl, butyl, etc. The halogen atom includes a fluorine atom, a chlorine atom, a bromine atom, etc.

Each of $R_3$ and $R_4$ is independently a hydrocarbon group having 1 to 10 carbon atoms. The hydrocarbon group is preferably an alkylene group having 1 to 10 carbon atoms, more preferably an alkylene group having 1 to 4 carbon atoms, still more preferably an ethylene group.

p and q are repetition numbers of —($R_3$—O)— and —(O—$R_4$)—. Each of p and q is independently an integer of 0 or more, preferably an integer of 0 to 20, more preferably an integer of 0 to 12, still more preferably an integer of 0 to 8, particularly preferably an integer of 0 to 4, most preferably an integer of 0 or 1. Each of m and n is independently an integer of 0 to 4.

(Unit (A1))

The unit (A) is preferably a unit (A1) of the following formula in which p and q are 0.

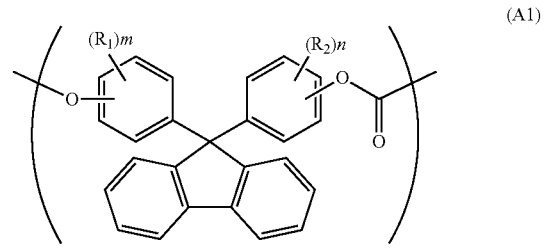

(A1)

wherein $R_1$, $R_2$, m and n are as defined in the unit (A).

The unit (A1) includes units derived from 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-n-isopylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-butylphenyl)fluorene, 9,9-bis(4-hydroxy-3-cyclohexylphenyl)fluorene, and 9,9-bis(4-hydroxy-3-phenylphenyl)fluorene. These compounds for introducing the units (A1) may be used singly or in combination of two or more of them.

(Unit (A2))

The unit (A) is preferably a unit (A2) of the following formula, derived from 9,9-bis(4-hydroxy-3-methylphenyl)fluorene.

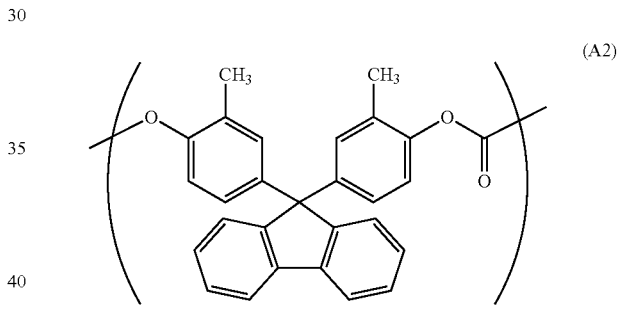

(A2)

In the copolycarbonate comprising unit (A2), the b value when a solution of 10 g thereof in 50 ml of ethanol is measured in an optical distance of 30 mm is preferably 6.0 or less, more preferably 5.5 or less, still more preferably 5.0 or less. When the b value is in the above range, an optical film formed from the copolycarbonate has a good hue and has high strength.

The 9,9-bis(4-hydroxy-3-methylphenyl)fluorene as a raw material for the unit (A2) can be obtained by a reaction between o-cresol and fluorenone. The 9,9-bis(4-hydroxy-3-methylphenyl)fluorene having a small b value can be obtained by removing impurities.

Specifically, purified 9,9-bis(4-hydroxy-3-methylphenyl)fluorene can be obtained by distilling off unreacted o-cresol after the reaction between o-cresol and fluorenone, dissolving the residue in an alcohol, ketone or benzene derivative solvent, adding activated clay or activated carbon thereto, filtering the solution, and then, filtering a crystallized product from a filtrate. The impurities that are to be removed are a 2,4'-dihydroxy material, a 2,2'-dihdyroxy material and impurities having unknown structures. The alcohol solvent that is used for the above purification preferably includes lower alcohols such as methanol, ethanol, propanol and butanol. The ketone solvent preferably includes lower aliphatic ketones such as acetone, methyl ethyl ketone, methyl isopropyl ketone and cyclohexanone and mixtures of these. The benzene derivative solvent preferably includes toluene, xylene, benzene and mixtures of these. The amount of the solvent is sufficiently an amount in which the fluorene compound is fully dissolved, and it is generally approximately twice to 10 times the amount of the fluorene compound. The activated clay can be selected from commercially available activated clay formed of a powdery or particulate silica-alumina. Further, the activated carbon can be selected from commercially available activated carbon in the form of a power or particles.

(Unit (A3))

The unit (A) is preferably a unit (A3) of the following formula in which p and q are integers of 1 or more.

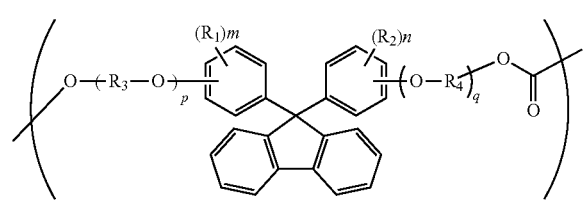

wherein $R_1$, $R_2$, m, n, $R_3$ and $R_4$ are as defined in the unit (A). Each of p and q is independently preferably an integer of 1 to 20, more preferably an integer of 1 to 12, still more preferably an integer of 1 to 8, particularly preferably an integer of 1 to 4, most preferably 1.

The unit (A3) includes units derived from 9,9-bis[4-(2-hydroxyethoxy)phenyl]fluorene, 9,9-bis[4-(3-hydroxypropoxy)phenyl]fluorene, 9,9-bis[4-(4-hydroxybutoxy)phenyl]fluorene, 9,9-bis[4-(2-hydroxyethoxy)-3-methylphenyl]fluorene, 9,9-bis[2-(2-hydroxyethoxy)-5-methylphenyl]fluorene, 9,9-bis[4-(2-hydroxyethoxy)-3-ethylphenyl]fluorene, 9,9-bis[4-(2-hydroxyethoxy)-3-propylphenyl]fluorene, 9,9-bis[4-(2-hydroxyethoxy)-3-isopropylphenyl]fluorene, 9,9-bis[4-(2-hydroxyethoxy)-3-n-butylphenyl]fluorene, 9,9-bis[4-(2-hydroxyethoxy)-3-isobutylphenyl]fluorene, 9,9-bis[4-(2-hydroxyethoxy)-3-(1-methylpropyl)phenyl]fluorene, 9,9-bis[4-(3-hydroxypropoxy)-3-methylphenyl]fluorene, 9,9-bis[4-(4-hydroxybutoxy)-3-methylphenyl]fluorene, 9,9-bis[4-(2-hydroxyethoxy)-3,5-dimethylphenyl]fluorene, 9,9-bis[4-(2-hydroxyethoxy)-2,5-dimethylphenyl]fluorene, 9,9-bis[4-(2-hydroxyethoxy)-3,5-diethylphenyl]fluorene, 9,9-bis[4-(2-hydroxyethoxy)-3,5-dipropylphenyl]fluorene, 9,9-bis[4-(2-hydroxyethoxy)-3,5-diisopropylphenyl]fluorene, 9,9-bis[4-(2-hydroxyethoxy)-3,5-di-n-butylphenyl]fluorene, 9,9-bis[4-(2-hydroxyethoxy)-3,5-diisobutylphenyl]fluorene, 9,9-bis[4-(2-hydroxyethoxy)-3,5-bis(1-methylpropyl)phenyl]fluorene, 9,9-bis[4-(3-hydroxypropoxy)-3,5-dimethylphenyl]fluorene, 9,9-bis[4-(4-hydroxybutoxy)-3,5-dimethylphenyl]fluorene, 9,9-bis[4-(2-hydroxyethoxy)-3-cyclohexylphenyl]fluorene, 9,9-bis[4-(2-hydroxyethoxy)-3-phenylphenyl]fluorene, 9,9-bis[4-(2-hydroxyethoxy)-3,5-diphenylphenyl]fluorene, 9,9-bis[4-(2-hydroxyethoxy)-3-benzylphenyl]fluorene, 9,9-bis[4-(2-hydroxyethoxy)-3,5-dibenzylphenyl]fluorene, 9,9-bis[4-(2-hydroxyethoxy)-3-propenylphenyl]fluorene, 9,9-bis[4-(2-hydroxyethoxy)-3-fluorophenyl]fluorene, and 9,9-bis(hydroxyalkoxyphenyl)fluorenes of these. Further, it includes units derived from 9,9-bis[hydroxy-poly(alkyleneoxy)phenyl]fluorenes of the above formula in which p and q are 2 or more.

Of these, 9,9-bis[4-(2-hydroxyethoxy)phenyl]fluorene and 9,9-bis[4-(2-hydroxyethoxy)-3-methylphenyl]fluorene are preferred.

The above compounds for introducing the unit (A3) may be used singly or in combination of two or more of them.

Compounds for introducing the unit (A3) can be obtained by reacting 9,9-bis(hydroxyphenyl)fluorenes with compounds (alkylene oxide, haloalkanol, etc.) corresponding to the groups $R_3$ and $R_4$. For example, 9,9-bis[4-(2-hydroxyethoxy)phenyl]fluorene can be obtained by adding ethylene oxide to 9,9-bis(4-hydroxyphenyl)fluorene, and 9,9-bis[4-(3-hydroxypropoxy)phenyl]fluorene can be obtained, for example, by reacting 9,9-bis[4-hydroxyphenyl]fluorene with 3-chloropropanol under an alkaline condition. In addition, 9,9-bis(hydroxyphenyl)fluorene can be obtained by a reaction between a fluorenone (9-fluorenone, etc.) and a corresponding phenol, and 9,9-bis(4-hydroxyphenyl)fluorene can be obtained, for example, by a reaction between a phenol and 9-fluorenone.

(Unit (A4))

As the unit (A3), a unit (A4) of the following formula, derived from 9,9-bis[4-(2-hydroxyethoxy)phenyl]fluorene (BPEF), is preferred.

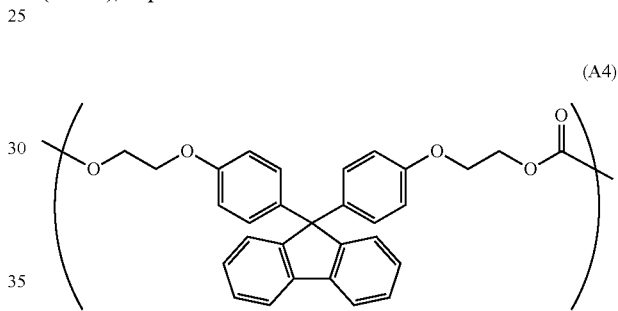

A copolycarbonate comprising the units (A1) and (A2) has excellent heat resistance and a low photoelastic constant as compared with a copolycarbonate comprising the units (A3) and (A4), so that non-uniformity is not thermally easily caused.

(Unit (B))

The unit (B) is represented by the following formula.

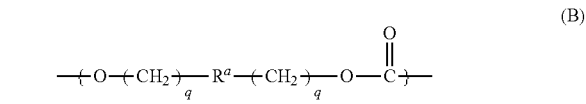

In the formula, $R^a$ is a monocyclic or polycyclic alicyclic hydrocarbon group having 4 to 20 carbon atoms, the above alicyclic hydrocarbon group may contain a hetero atom and also may have a bridge structure, and q is 0 or 1.

$R^a$ includes a cycloalkylene group which may have a substituent. The cycloalkylene group includes a cyclobutylene group, a cyclohexylene group of the following formula, a cyclooctylene group and a cyclodecylene group.

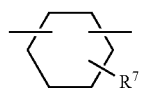

wherein $R^7$ is an alkyl group having 1 to 12 carbon atoms or a hydrogen atom.

$R^a$ includes a group of the following formula.

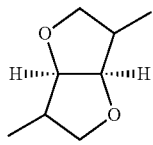

$R^a$ includes a group of the following formula. Specifically, it includes a tricyclodecane-diyl group and a pentacyclodecane-dinyl group.

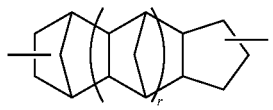

wherein r is 0 or 1.

$R^a$ includes a group of the following formula, such as a decaline-diyl group.

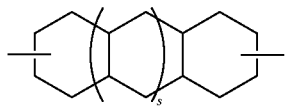

wherein s is 0 or 1.

$R^a$ includes a norbornene-diyl group having a bridge structure, represented by the following formula.

$R^a$ includes an adamantane-diyl group having a bridge structure, represented by the following formula.

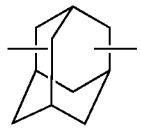

$R^a$ includes a group having a hetero atom, represented by the following formula.

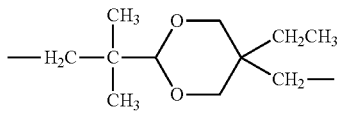

The hetero atom includes oxygen, nitrogen, phosphorus and sulfur atoms. The heteroatom preferably includes oxygen, nitrogen and sulfur atoms, and it is more preferably an oxygen atom.

$R^a$ in the unit (B) is preferably at least one group selected from the class consisting of an optionally substituted cycloalkylene group having 4 to 20 carbon atoms, an optionally substituted cycloalkoxylene group having 4 to 20 carbon atoms,

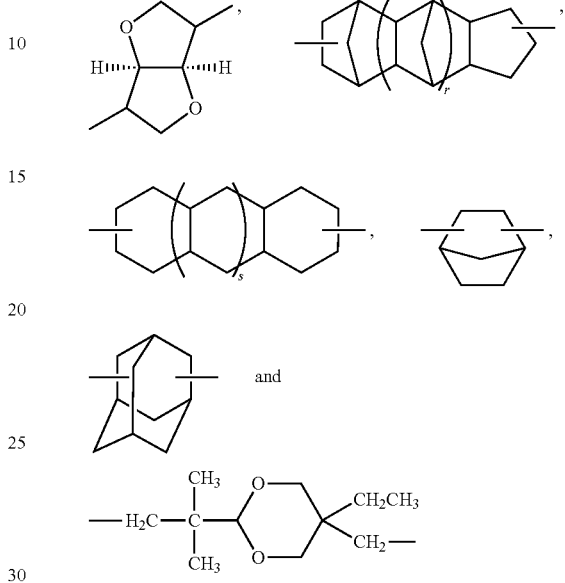

in which each of r and s is independently 0 or 1.

The optionally substituted cycloalkylene group having 4 to 20 carbon atoms includes a cyclobutylene group, a cyclohexylene group and a cyclooctylene group. The substituent includes an alkyl group having 1 to 3 carbon atoms such as methyl, ethyl and propyl, and halogen atoms such as a fluorine atom, a chlorine atom and a bromine atom.

The optionally substituted cycloalkoxylene group having 4 to 20 carbon atoms includes a cyclobutoxylene group, a cyclohexyloxylene group and a cyclooctyloxylene group. The substituent includes an alkyl group having 1 to 3 carbon atoms such as methyl, ethyl and propyl, and halogen atoms such as a fluorine atom, a chlorine atom and a bromine atom.

The unit (B) includes a unit (Ba) of the following formula in which q is 1 and a unit (Bb) of the following formula in which q is 0.

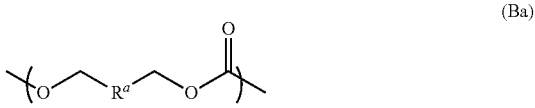

(Ba)

in which $R^a$ is as defined in the unit (B).

(Bb)

in which $R^a$ is as defined in the unit (B).

(Unit (B1))

The unit (B) is preferably a unit (B1) of the following formula.

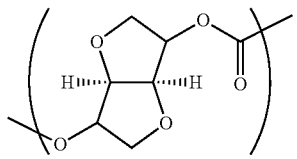
(B1)

The unit (B1) is a unit derived from an ether diol, and the above ether diol specifically includes a unit (B1-1) derived from isosorbide, a unit (B1-2) derived from isomannide and a unit (B1-3) derived from isoidide which have the relationships of being stereoisomers to one another.

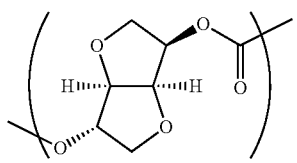
(B1-1)

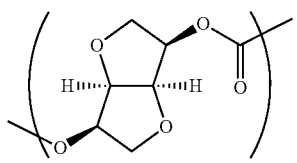
(B1-2)

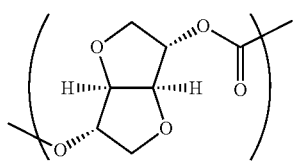
(B1-3)

These ether diols derived from sugar are substances that are also obtained from biomass in nature and are ones of so-called renewable resources. Isosorbide can be obtained by hydrogenating D-glucose obtained from starch and then subjecting it to dehydration. The other ether diols can be also obtained by like reactions except for starting materials.

In particular, the unit is preferably a unit derived from isosorbide (1,4,3,6-dianhydro-D-sorbitol). Isosorbide is an ether diol that can be easily prepared from starch, etc., and is available in abundance as a material, and it is excellent in all of easiness in production, properties and broadness in use as compared with isomannide and isoidide.

(Unit (B2))

The unit (B) is preferably a unit (B2) of the following formula.

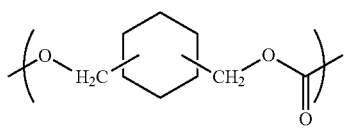
(B2)

(Unit (B3))

The unit (B) is preferably a unit (B3) of the following formula.

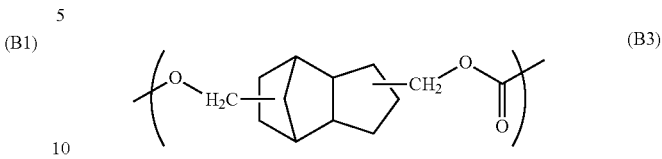
(B3)

(Unit (B4))

The unit (B) is preferably a unit (B4) of the following formula.

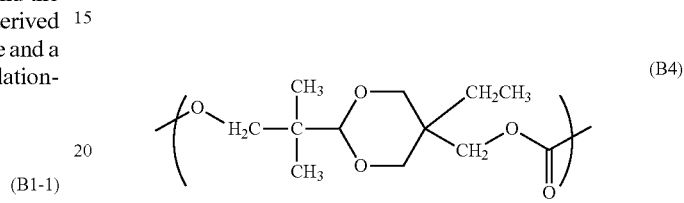
(B4)

Therefore, the copolycarbonate preferably comprises unit (A2) of the following formula,

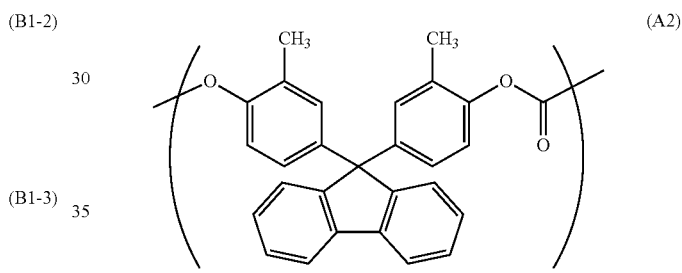
(A2)

and at least one unit (Bi) selected from the class consisting units of the following formulae.

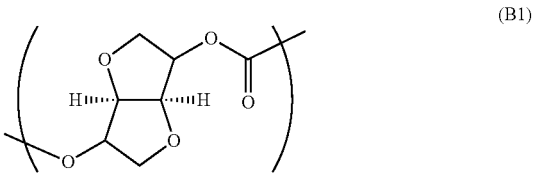
(B1)

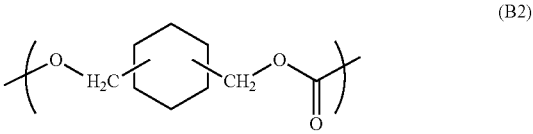
(B2)

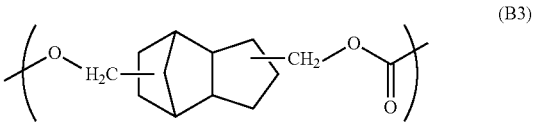
(B3)

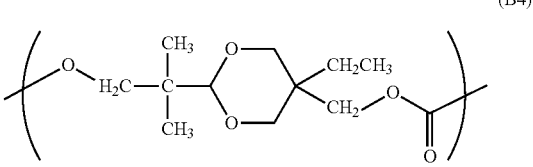
(B4)

Further, the copolycarbonate preferably comprises a unit (A4) of the following formula,

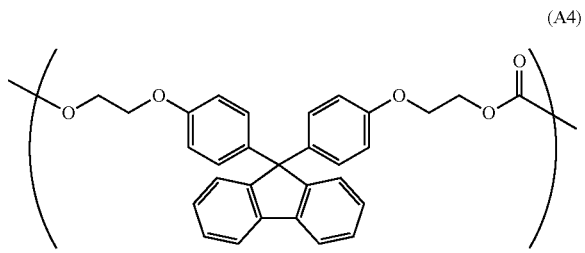
(A4)

and at least one unit (Bi) selected from the class consisting of units of the following formulae.

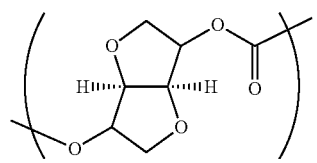
(B1)

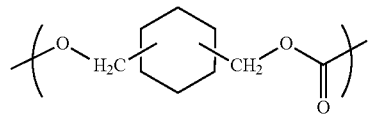
(B2)

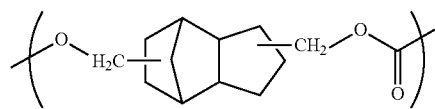
(B3)

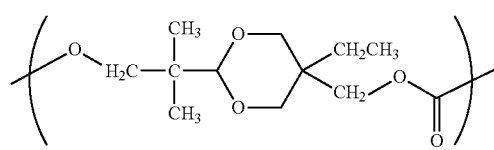
(B4)

(Compositional Ratio)

In the copolycarbonate, the content of the unit (A) is 25 to 90 mol %, preferably 30 to 90 mol %, and the content of the unit (B) is 10 to 75 mol %, preferably 10 to 70 mol %.

When the content of the unit (A) is less than 25 mol %, the chromatic dispersion of the copolycarbonate is no longer any inverse dispersion property, and there is caused a problem on the optical properties. When the content of the unit (A) exceeds 90 mol %, the glass transition temperature of the copolycarbonate is high, and there is caused a problem on the processability. Further, the photoelastic constant is over $30 \times 10^{-12}$ $Pa^{-1}$. The compositional ratio is required to be controlled such that the compositional ratio after the polymerization has a deviation of 0.5 mol % or less, preferably 0.3 mol % or less, from the compositional ratio on the charged amount basis. When it exceeds 0.5 mol %, the chromatic dispersion changes to a great extent, and it leads to a quality problem. The contents of the unit (A) and the unit (B) are measured and calculated on the basis of the proton NMR of JNM-AL400 supplied by JEOL Ltd.

The contents of the unit (A) and the unit (B) can be adjusted by blending a polycarbonate formed of unit (A) alone or a polycarbonate formed of unit (B) alone with a copolycarbonate comprising the unit (A) and the unit (B).

(Glass Transition Temperature: Tg)

The glass transition temperature (Tg) of the copolycarbonate is preferably 100 to 200° C., more preferably 140 to 200° C., still more preferably 140 to 180° C. When the glass transition temperature (Tg) is lower than 100° C., heat resistance stability is poor, and a retardation value changes with time, which may sometimes affect the display quality. When the glass transition temperature (Tg) is higher than 200° C., melt-polymerization is difficult since the viscosity is too high. The glass transition temperature (Tg) is measured with 2910 type DSC supplied by T. A. Instruments (Japan) at a temperature elevation rate of 20° C./minute.

(Photoelastic Constant)

The absolute value of photoelastic constant of the copolycarbonate is preferably $30 \times 10^{-12}$ $Pa^{-1}$ or less, more preferably $28 \times 10^{-12}$ $Pa^{-1}$ or less, still more preferably $25 \times 10^{-12}$ $Pa^{-1}$ or less. When the absolute value is larger than $30 \times 10^{-12}$ $Pa^{-1}$, undesirably, birefringence caused by a stress is large, and a light omission takes place when it is used as a retardation film. The photoelastic constant is measured by taking a 50 mm long and 10 mm wide test piece from a film and measuring it with a spectroellipsometer M-220 supplied by JASCO Corporation.

(Production of Copolycarbonate)

The copolycarbonate can be produced by melt-polymerizing a fluorenedihydroxy component, an aliphatic diol component and a carbonate diester.

The fluorenedihydroxy component is represented by the following formula.

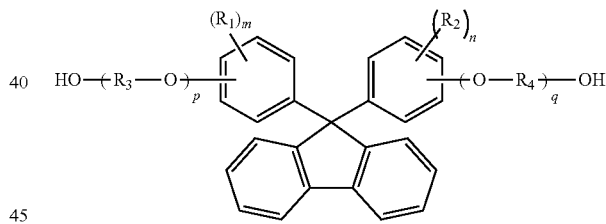

wherein $R_1$, $R_2$, $R_3$, $R_4$, m, n, p and q are as defined in the unit (A).

The aliphatic diol component includes compounds of the following formula. Specifically, it includes 1,2-cyclohexanedimethanol, 1,3-cyclohexanedimethanol and 1,4-cyclohexanedimethanol.

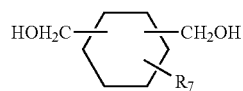

wherein $R_7$ is an alkyl group having 1 to 12 carbon atoms or a hydrogen atom.

The aliphatic diol component includes compounds of the following formula. Specifically, it includes tricyclodecanedimethanol and pentacyclodecanedimethanol.

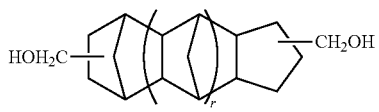

wherein r is 0 or 1.

The aliphatic diol component includes compounds of the following formula. Specifically, it includes 2,6-decalindimethanol, 1,5-decalindimethanol and 2,3-decalindimethanol.

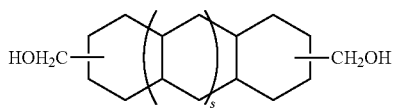

wherein s is 0 or 1.

The aliphatic diol component includes compounds of the following formula. Specifically, it includes 2,3-norbornanedimethanol and 2,5-norbornanedimethanol.

The aliphatic diol component includes compounds of the following formula. Specifically, it includes 1,3-adamantanedimethanol.

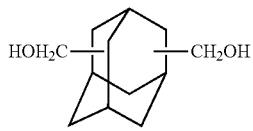

The aliphatic diol component includes compounds of the following formula. Specifically, it includes 1,2-cyclohexanediol, 1,3-cyclohexanediol and 1,4-cyclohexanediol.

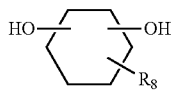

wherein $R_8$ is an alkyl group having 1 to 12 carbon atoms or a hydrogen atom.

The aliphatic diol component includes compounds of the following formula. Specifically, it includes tricyclodecanediol and pentacyclodecanediol.

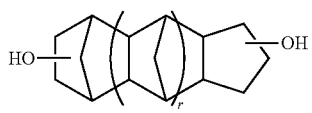

wherein r is 0 or 1.

The aliphatic diol component includes compounds of the following formula. Specifically, it includes 2,6-decalindiol, 1,5-decalindiol and 2,3-decalindiol.

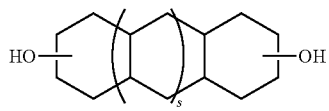

wherein s is 0 or 1.

The aliphatic diol component includes compounds of the following formula. Specifically, it includes 2,3-norbornanediol and 2,5-norbornanediol.

The aliphatic diol component includes compounds of the following formula. Specifically, it includes 1,3-adamantanediol.

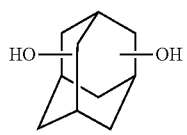

The aliphatic diol component includes hetero-atom-possessing compounds of the following formulae.

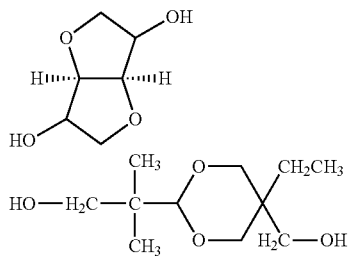

The carbonate diester includes esters of an optionally substituted aryl group having 6 to 12 carbon atoms or an aralkyl group. Specifically, it includes diphenyl carbonate, ditolyl carbonate, bis(chlorophenyl)carbonate and bis(m-cresyl)carbonate. Of these, diphenyl carbonate is particularly preferred.

The amount of the diphenyl carbonate for use per mole of total of dihydroxy compounds is preferably 0.97 to 1.10 mol, more preferably 1.00 to 1.06 mol.

For accelerating the polymerization speed in the melt-polymerization method, a polymerization catalyst may be used. The polymerization catalyst includes an alkali metal compound, an alkaline earth metal compound, a nitrogen-containing compound and a metal compound.

Organic acid salts, inorganic acid salts, hydroxides, hydrides, alkoxides and quaternary ammonium hydroxides of alkali metals and alkaline earth metals are preferably used as such compounds. These compounds may be used singly or in combination.

The alkali metal compound includes sodium hydroxide, potassium hydroxide, cesium hydroxide, lithium hydroxide, sodium bicarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate and disodium phenylphosphate. It also includes disodium salt, dipotassium salt, dicesium salt and dilithium salt of bisphenol A, and also includes sodium salt, potassium salt, cesium salt and lithium salt of phenol.

The alkaline earth metal compound includes magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate and barium diacetate.

The nitrogen-containing compound includes quaternary ammonium hydroxides having an alkyl or aryl group, such as tetramethylammonium hydroxide, tetraethylammonium hydroxide, tetrapropylammonium hydroxide, tetrabutylammonium hydroxide and trimethylbenzylammonium hydroxide. It also includes tertiary amines such as triethylamine, dimethylbenzylamine and triphenylamine, and imidazoles such as 2-methylimidazole, 2-phenylimidazole and benzoimidazole. Further, it also includes bases or basic salts such as ammonia, tetramethylammonium borohydride, tetrabutylammonium borohydride, tetrabutylammonium tetraphenylborate and tetraphenylammonium tetraphenylborate. The metal compound includes a zinc aluminum compound, a germanium compound, an organotin compound, an antimony compound, a manganese compound, a titanium compound and a zirconium compound. These compounds may be used singly or in combination of two or more of them.

The amount of the polymerization catalyst for use per mole of the diol component is preferably $1 \times 10^{-9}$ to $1 \times 10^{-2}$ equivalent weight, more preferably $1 \times 10^{-8}$ to $1 \times 10^{-3}$ equivalent weight, still more preferably $1 \times 10^{-7}$ to $1 \times 10^{-3}$ equivalent weight.

The melt polycondensative reaction is carried out by heating a reaction system in an inert gas atmosphere under reduced pressure with stirring and thereby distilling off a formed monohydroxy compound as is conventionally known.

The reaction temperature is normally in the range of 120 to 350° C., and at a later stage of the reaction, the degree of reduced pressure is increased to 10 to 0.1 Torr to easily distill off the formed monohydroxy compound, whereby the reaction is completed. A terminal stopper and an antioxidant may be added as required.

At a later stage of the reaction, a catalyst deactivator may be added. Known catalyst deactivators can be effectively used as a catalyst deactivator, and ammonium salt or phosphonium salt of sulfonic acid is above all preferred. Further, salts of dodecylbenzenesulfonic acid such as dodecylbenzenesulfonic acid tetrabutylphosphonium salt and salts of p-toluenesulfonic acid such as p-toluenesulfonic acid tetrabutylammonium salt are preferred.

Further, the catalyst deactivator is preferably selected from esters of sulfonic acids such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and a phenyl p-toluenesulfonate. Of these, dodecylbenzenesulfonic acid tetrabutylphosphonium salt is most preferably used. When at least one polymerization catalyst selected from alkali metal compounds and/or alkaline earth metal compounds is used, the amount of the catalyst deactivator that can be used per mole of the catalyst is 0.5 to 50 mol, more preferably 0.5 to 10 mol, still more preferably 0.8 to 5 mol.

Further, additives such as a thermal stabilizer, a plasticizer, a photostabilizer, a polymerization metal deactivating agent, a flame retardant, a lubricant, an antistatic agent, a surfactant, an anti-fungus agent, an ultraviolet absorbent and a mold release agent may be added as required depending upon fields of use.

(Production of Optical Film)

The optical film can be produced, for example, by a solution casting method, a melt-extrusion method, a hot pressing method or a calender method. Of these, a melt-extrusion method is preferred from the viewpoint of productivity.

In the melt-extrusion method, a method of extruding a resin through a T-die and sending an extrudate to a cooling roll is preferably used. The temperature at this time is determined depending upon the molecular weight, Tg and melt-flowability of the copolycarbonate, while it is in the range of 180 to 350° C., more preferably in the range of 200° C. to 320° C. When it is lower than 180° C., undesirably, the viscosity is high, the orientation and stress strain of the polymer are liable to remain. When it is higher than 350° C., the problems of thermal deterioration, coloring and die lines (streaks) from T-die are liable to be caused.

Further, since the copolycarbonate used in this invention has good solubility in an organic solvent, a solution casting method can be also applied. In the solution casting method, the solvent can be suitably selected from methylene chloride, 1,2-dichloroethane, 1,1,2,2-tetrachloroethane, dioxolane or dioxane. The content of a residual solvent in the film in the solution casting method is preferably 2% by weight or less, more preferably 1% by weight or less. When it exceeds 2% by weight, the residual solvent is too much, and the glass transition temperature of the film is greatly decreased, which is undesirable in respect of heat resistance.

The thickness of an unstretched film is preferably in the range of 30 to 400 μm, more preferably in the range of 40 to 300 μm. When the above film is further stretched to form a retardation film, it can be determined as required in the above range while a desired retardation value and thickness of the optical film are taken into account.

The thus-obtained unstretched film is stretched to give a retardation film. As a stretching method, there may be employed a known method of monoaxial stretching in the machine direction, monoaxial stretching in the transverse direction with a stenter, concurrent biaxial stretching that is a combination of these, or consecutive biaxial stretching. Further, a continuous method is preferred in view of productivity, while a batch method may be employed. The stretching temperature is preferably in the range of (Tg−20° C.) to (Tg+50° C.), more preferably in the range of (Tg−10° C.) to (Tg+30° C.), in which Tg is a glass transition temperature of the copolycarbonate. In the above temperature range, preferably, the molecular motion of the polymer is proper, the relaxation by stretching takes place with difficulty, the inhibition of orientation is easy and an in-plane phase difference is easily obtained.

The stretch ratio is determined depending upon an intended retardation value, while the stretch ratio in each of the machine and transverse directions is 1.05 to 5 times, more preferably 1.1 to 4 times. The stretching may be carried out at a single step or at multi-steps. The above Tg when a film obtained by the solution casting method is stretched refers to a glass transition temperature of the above film containing a very small amount of a solvent.

(Chromatic Dispersion)

The optical film of this invention has a feature that the in-plane retardation of the film in the visible light region of wavelengths of 400 to 800 nm decreases with a decrease in wavelength. That is, the film satisfies the following expression (1).

$$R(450)<R(550)<R(650) \quad (1)$$

in which R(450), R(550) and R(650) are in-plane retardation values of the film at wavelengths of 450 nm, 550 nm and 650 nm, respectively.

The above in-plane retardation value is defined by the following expression, and it is a feature that shows a retardation in phase between X direction in which light is transmitted at right angles with the film and Y direction perpendicular thereto.

$$R=(n_x-n_y)\times d$$

in which $n_x$ is a refractive index of in-plane of the film in the main stretching direction, $n_y$ is a refractive index perpendicular to the main stretching direction of in-plane of the film and d is a thickness of the film. The above main stretching direction refers to a stretching direction when monoaxial stretching is carried out, and refers to a stretching direction in which the stretching is carried out to increase the stretch degree more when biaxial stretching is carried out, and it refers to an orientation direction of a polymer chain as far as a chemical structure is concerned.

(Thickness, Etc.)

The thickness of the optical film of this invention is preferably in the range of 20 to 200 μm, more preferably in the range of 20 to 150 μm. When the thickness is in this range, a retardation value desired can be easily obtained by the stretching, and, preferably, it is easy to form the film.

In the optical film of this invention, the photoelastic constant of the copolycarbonate constituting the film is low. Therefore, a change in phase difference against a stress is small, and a liquid crystal display having such a retardation film is excellent in display stability.

The optical film of this invention has high transparency. The total light transmittance of the 100 μm thick optical film of this invention is preferably 85% or more, more preferably 88% or more. The haze value of the optical film of this invention is preferably 5% or less, more preferably 3% or less.

The film of this invention can be used as a retardation film. This invention includes a liquid crystal display having the above retardation film. This invention includes a circularly polarizing film formed of the film of this invention and a polarizing layer. This invention includes a display device using the above circularly polarizing film as an anti-reflection film.

PREFERRED EMBODIMENTS

The film of this invention includes the following films (I) to (VI) as preferred embodiments.

(Films (I), (III) and (V))

The films (I), (III) and (V) are films comprising the unit (A2) of the following formula and at least one unit (Bi) selected from the units of the following formulae (B1) to (B4).

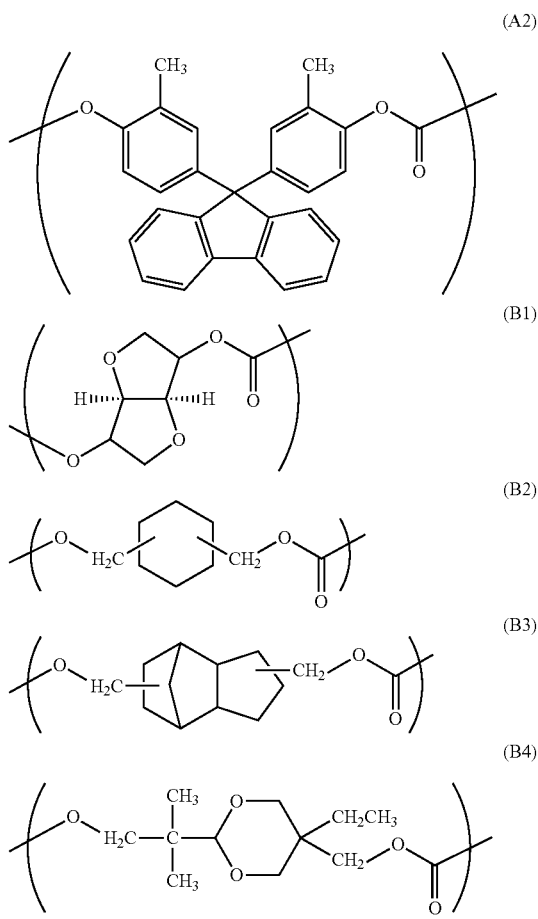

(Film (I))
(Compositional Ratio)

The copolycarbonate for the film (I) preferably contains 25 mol % or more but less than 40 mol % of the unit (A2) and over 60 mol % but 75 mol % or less of at least one unit (Bi) selected from the units of the formulae (B1) to (B4), and has a photoelastic constant absolute value of $25\times10^{-12}$ Pa$^{-1}$ or less. The copolycarbonate more preferably contains 30 mol % or more but less than 40 mol % of the unit (A2) and over 60 mol % but 70 mol % or less of at least one unit (Bi) selected from the units of the formulae (B1) to (B4). The copolycarbonate still more preferably contains over 30 mol % but less than 40 mol % of the unit (A2) and over 60 mol % but less than 70 mol % of at least one unit (Bi) selected from the units of the formulae (B1) to (B4).

(Chromatic Dispersion)

The film (I) is a film that satisfies the following expressions (2) and (3), $$0<R(450)/R(550)<1 \quad (2)$$

$$1.01<R(650)/R(550)<2 \quad (3)$$

and that exhibits a so-called inverse chromatic dispersion. The film (I) is suitably used as a retardation film in a liquid crystal display.

The film (I) more preferably satisfies the following conditions.

$$0.6<R(450)/R(550)<1 \quad (2\text{-}1)$$

$$1.01<R(650)/R(550)<1.40 \quad (3\text{-}1)$$

The film (I) still more preferably satisfies the following conditions.

$$0.65 < R(450)/R(550) < 0.92 \quad (2\text{-}2)$$

$$1.01 < R(650)/R(550) < 1.30 \quad (3\text{-}2)$$

The film (I) particularly preferably satisfies the following conditions.

$$0.7 < R(450)/R(550) < 0.91 \quad (2\text{-}3)$$

$$1.03 < R(650)/R(550) < 1.20 \quad (3\text{-}3)$$

The film in-plane retardation value R(550) of the film (I) at a wavelength of 550 nm is preferably R(550)>50 nm. The film (I) can be used as a λ/4 film or λ/2 film in a broad band in the form of a single layer without stacking layers. In such a use, desirably, the λ/4 film satisfies 100 nm<R(550)<180 nm, and the λ/2 film satisfies 220 nm<R(550)<330 nm.

The film (I) preferably satisfies the following expressions (8) to (10).

$$|R(400)/R(550) - 400/550| < 0.15 \quad (8)$$

$$|R(700)/R(550) - 700/550| < 0.25 \quad (9)$$

$$|R(400)/R(550) - 400/550|^2 + |R(700)/R(550) - 700/550|^2 < 0.05 \quad (10)$$

wherein R(400), R(550) and R(700) are film in-plane retardation values at the wavelengths of 400 nm, 550 nm and 700 nm, respectively.

The film (I) more preferably satisfies the following expressions (8)', (9)' and (10)'.

$$|R(400)/R(550) - 400/550| < 0.10 \quad (8)'$$

$$|R(700)/R(550) - 700/550| < 0.23 \quad (9)'$$

$$|R(400)/R(550) - 400/550|^2 + |R(700)/R(550) - 700/550|^2 < 0.047 \quad (10)'$$

The film (I) still more preferably satisfies the following expressions (8)", (9)" and (10)".

$$|R(400)/R(550) - 400/550| < 0.05 \quad (8)''$$

$$|R(700)/R(550) - 700/550| < 0.21 \quad (9)''$$

$$|R(400)/R(550) - 400/550|^2 + |R(700)/R(550) - 700/550|^2 < 0.045 \quad (10)''$$

The above expressions (8), (9) and (10) are expressions for attaining a broader band of the retardation film. For attaining a broader band, it is required to satisfy the following expression in a broad range of visible light, $$R(\lambda) = c\lambda$$

wherein R(λ) is a retardation value (nm) at a measurement wavelength λ(nm), c is a constant of c>0, and the range of λ is 400 nm ≦ λ ≦ 800 nm. A wavelength of 400 nm is used as an index on the short wavelength side, and a wavelength of 700 nm is used as an index on the long wavelength side.

The film (I) satisfying the expressions (8), (9) and (10) is excellent in visibility since black under crossed Nicols in a reflection mode is intensified.

When |R(400)/R(550)−400/550| is 0.15 or more, a light omission takes place on the short wavelength side, which is a problem. When |R(700)/R(550)−700/550| is 0.25 or more, a light omission takes place on the long wavelength side, which is a problem. Further, when |R(400)/R(550)−400/550|²+|R(700)/R(550)−700/550|² is 0.05 or more, a light omission takes place in the visible light region.

The film in-plane retardation value R(550) of the above film at a wavelength of 550 nm is preferably R(550)>50 nm. The above film can be used as a λ/4 film or λ/2 film in a broad band in the form of a single layer without stacking layers. In such a use, desirably, the λ/4 film satisfies 100 nm<R(550)<180 nm, and the λ/2 film satisfies 220 nm<R(550)<330 nm.

The chromatic dispersion is measured by taking a 100 mm long and 70 mm wide test piece from a film, stretching it 2.0 times in the machine direction at a stretching temperature of Tg+10° C. and measuring the resultant film with a spectroellipsometer M-220 supplied by JASCO Corporation.

(Retardation Exhibition Capability)

The retardation exhibition capability (Δn) of the film (I) satisfies the following expression (11).

$$0.3 > \Delta n > 0.003 \quad (11)$$

(Δn=R(550)(nm)/thickness (nm))

More preferably, it satisfies the following expression (11)'.

$$0.1 > \Delta n > 0.0033 \quad (11)'$$

Still more preferably, it satisfies the following expression (11)".

$$0.05 > \Delta n > 0.0037 \quad (11)''$$

When the retardation exhibition capability Δn is 0.0037 or more, preferably, the thickness of a λ/4 film can be decreased, and as a result, the thickness of a display can be decreased.

(Film (III))
(Compositional Ratio)

The copolycarbonate for the film (III) preferably contains 40 mol % or more but less than 60 mol % of the unit (A2) and over 40 mol % but 60 mol % or less of at least one unit (Bi) selected from the units of the formulae (B1) to (B4) and has a photoelastic constant absolute value of $25 \times 10^{-12}$ Pa$^{-1}$ or less. The copolycarbonate more preferably contains 45 to 55 mol of the unit (A2) and 55 to 45 mol % of at least one unit (Bi) selected from the units of the formulae (B1) to (B4).

(Chromatic Dispersion)

The film (III) satisfies the conditions of the following (4) to (6).

$$-30 < R(450) < 0 \quad (4)$$

$$-10 < R(550) < 10 \quad (5)$$

$$0 < R(650) < 30 \quad (6)$$

The film (III) more preferably satisfies the following conditions.

$$-20 < R(450) < 0 \quad (4\text{-}1)$$

$$-5 < R(550) < 5 \quad (5\text{-}1)$$

$$0 < R(650) < 20 \quad (6\text{-}1)$$

The film (III) is excellent in transparency. The film (III) has a low optical anisotropy. That is, the film in-plane retardation value of the film (III) at a wavelength of 400 to 800 nm is nearly zero. Therefore, the film (III) can be used as a protective film for a polarizing film of a liquid crystal display.

(Film (V))
(Compositional Ratio)

The copolycarbonate for the film (V) preferably contains 60 to 90 mol % of the unit (A2) and 10 to 40 mol % of at least one unit (Bi) selected from the units of the formulae (B1) to (B4) and has a photoelastic constant absolute value of $30 \times 10^{-12}$ Pa$^{-1}$ or less. The copolycarbonate more preferably contains 65 to 90 mol % of the unit (A2) and 10 to 35 mol % of at least one unit (Bi) selected from the units of the formulae (B1) to (B4).

(Chromatic Dispersion)

The film (V) preferably satisfies the following conditions.

$$R(450)<R(550)<R(650)<0 \quad (7)$$

(Retardation Exhibition Capability)

The retardation exhibition capability (Δn) of the film (V) satisfies the following expression (12).

$$-0.001>\Delta n>-0.3 \quad (12)$$

(Δn=R(550)(nm)/thickness (nm))

More preferably, it satisfies the following expression (12)'.

$$-0.0015>\Delta n>-0.05 \quad (12)'$$

Having a negative birefringence property, the film (V) is suitable as a retardation film for an in-plane switching (IPS) mode liquid crystal display.

(Films (II), (IV) and (VI))

The films (II), (IV) and (VI) are films comprising the unit (A4) of the following expression and at least one unit (Bi) selected from the units of the following formulae (B1) to (B4).

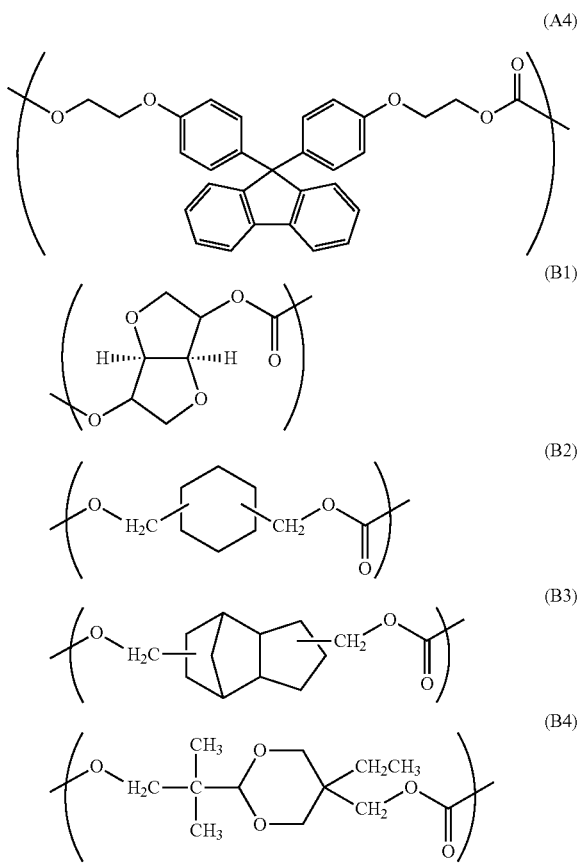

(Film (II))

(Compositional Ratio)

The copolycarbonate for the film (II) preferably contains 25 mol % or more but less than 65 mol % of the unit (A4) and over 35 mol % but 75 mol % or less of at least one unit (B1) selected from the units of the formulae (B1) to (B4) and has a photoelastic constant absolute value of $25 \times 10^{-12}$ $Pa^{-1}$ or less.

The copolycarbonate more preferably contains 30 to 60 mol % of the unit (A4) and 40 to 70 mol % of at least one unit (B1) selected from the units of the formulae (B1) to (B4).

(Retardation Exhibition Capability)

The film (II) is a film that satisfies the following expressions (2) and (3) and that exhibits a so-called inverse chromatic dispersion.

$$0<R(450)/R(550)<1 \quad (2)$$

$$1.01<R(650)/R(550)<2 \quad (3)$$

The film (II) is suitably used as a retardation film for a liquid crystal display.

The film (II) more preferably satisfies the following conditions.

$$0.6<R(450)/R(550)<1 \quad (2\text{-}1)$$

$$1.01<R(650)/R(550)<1.40 \quad (3\text{-}1)$$

The film (II) still more preferably satisfies the following conditions.

$$0.65<R(450)/R(550)<0.92 \quad (2\text{-}2)$$

$$1.01<R(650)/R(550)<1.30 \quad (3\text{-}2)$$

The film (II) particularly preferably satisfies the following conditions.

$$0.7<R(450)/R(550)<0.91 \quad (2\text{-}3)$$

$$1.03<R(650)/R(550)<1.20 \quad (3\text{-}3)$$

The film (II) preferably satisfies the following expressions (8) to (10).

$$|R(400)/R(550)-400/550|<0.15 \quad (8)$$

$$|R(700)/R(550)-700/550|<0.25 \quad (9)$$

$$|R(400)/R(550)-400/550|^2+|R(700)/R(550)-700/550|^2<0.05 \quad (10)$$

wherein R(400), R(550) and R(700) are film in-plane retardation values at the wavelengths of 400 nm, 550 nm and 700 nm, respectively.

The film (II) more preferably satisfies the following expressions (8)', (9)' and (10)'.

$$|R(400)/R(550)-400/550|<0.10 \quad (8)'$$

$$|R(700)/R(550)-700/550|<0.23 \quad (9)'$$

$$|R(400)/R(550)-400/550|^2+|R(700)/R(550)-700/550|^2<0.047 \quad (10)'$$

The film (II) still more preferably satisfies the following expressions (8)", (9)" and (10)".

$$|R(400)/R(550)-400/550|<0.05 \quad (8)''$$

$$|R(700)/R(550)-700/550|<0.21 \quad (9)''$$

$$|R(400)/R(550)-400/550|^2+|R(700)/R(550)-700/550|^2<0.045 \quad (10)''$$

(Retardation Exhibition Capability)

The retardation exhibition capability (Δn) of the film (II) satisfies the following expression.

$$0.3>\Delta n>0.002$$

(Δn=R(550)(nm)/thickness (nm))

More preferably, it satisfies the following expression (11)'.

$$0.1>\Delta n>0.002$$

Still more preferably, it satisfies the following expression (11)".

$$0.05 > \Delta n > 0.0023$$

(Film (IV))
(Compositional Ratio)

The copolycarbonate for the film (IV) preferably contains 65 mol % or more but less than 82 mol % of the unit (A4) and over 18 mol % but 35 mol % or less of at least one unit (Bi) selected from the units of the formulae (B1) to (B4) and has a photoelastic constant absolute value of $25 \times 10^{-12}$ $Pa^{-1}$ or less. The copolycarbonate more preferably contains 65 to 80 mol % of the unit (A4) and 20 to 35 mol % of at least one unit (Bi) selected from the units of the formulae (Bi) to (B4).

(Chromatic Dispersion)

The film (IV) satisfies the conditions of the following (4) to (6).

$$-30 < R(450) < 0 \quad (4)$$

$$-10 < R(550) < 10 \quad (5)$$

$$0 < R(650) < 30 \quad (6)$$

The film (IV) more preferably satisfies the following conditions.

$$-20 < R(450) < 0 \quad (4-1)$$

$$-5 < R(550) < 5 \quad (5-1)$$

$$0 < R(650) < 20 \quad (6-1)$$

The film (IV) is excellent in transparency. The film (IV) has a low optical anisotropy. That is, the film in-plane retardation value of the film (IV) at a wavelength of 400 to 800 nm is nearly zero. Therefore, the film (IV) can be used as a protective film for a polarizing film of a liquid crystal display.

(Film (VI))
(Compositional Ratio)

The copolycarbonate for the film (VI) preferably contains 82 to 90 mol % of the unit (A4) and over 10 to 18 mol % of at least one unit (Bi) selected from the units of the formulae (B1) to (B4) and has a photoelastic constant absolute value of $30 \times 10^{-12}$ $Pa^{-1}$ or less.

(Chromatic Dispersion)

The film (VI) preferably satisfies the following condition.

$$R(450) < R(550) < R(650) < 0 \quad (7)$$

(Retardation Exhibition Capability)

The retardation exhibition capability ($\Delta n$) of the film (VI) preferably satisfies the following expression (12).

$$-0.001 > \Delta n > -0.3 \quad (12)$$

($\Delta n = R(550)(nm)/thickness (nm)$)

Having a negative birefringence property, the film (VI) is suitable as a retardation film for an in-plane switching (IPS) mode liquid crystal display.

(Use)

The optical film of this invention is used for a retardation film, a plastic cell substrate film, a protective film for a polarizing film, an anti-reflection film, a brightness increasing film, a protective film for an optical disk and a diffusion film. In particular, it is preferred for a retardation film, a protective film for a polarizing film and an anti-reflection film.

EXAMPLES

This invention will be explained in detail hereinafter with reference to Examples, while this invention shall not be limited thereto. In Examples, "part" stands for "part by weight". Resins used in Examples and evaluation methods are as follows.

1. Photoelastic Constant Measurement

A 50 mm long and 10 mm wide test piece was taken from a central portion of a film, and measured for a photoelastic constant with a spectroellipsometer M-220 supplied by JASCO Corporation.

2. Retardation and Chromatic Dispersion Measurements

A 100 mm long and 70 mm wide test piece was taken from a central portion of a film and stretched 2.0 times in the machine direction at a stretching temperature of Tg+10° C., and the thus-obtained film was for a retardation and chromatic dispersion with a spectroellipsometer M-220 supplied by JASCO Corporation.

3. Tg (Glass Transition Temperature) Measurement

Measured with a 2910 type DSC supplied by T. A. Instruments Japan in a nitrogen atmosphere at a temperature elevation rate of 20° C./minute.

4. Polymer Compositional Ratio (NMR)

Measurement was made with a proton NMR of JNM-AL400 supplied by JEOL Ltd, and a polymer compositional ratio was calculated.

5. Viscosity Average Molecular Weight 0.7 gram of a copolycarbonate was dissolved in 100 mL of methylene chloride, and measured for a specific viscosity in a solution at 20° C., and the specific viscosity ($\eta_{sp}$) was inserted into the following equation to determine a viscosity average molecular weight.

$$\eta_{sp}/c = [\eta] + 0.45 \times [\eta]2c \text{(in which } [\eta] \text{ is an intrinsic viscosity)}$$

$$[\eta] = 1.23 \times 10^{-4} M^{0.83}$$

$$c = 0.7$$

6. Contrast Evaluation

Polarizing films on both the sides of a commercially available reflection type VA liquid crystal panel were peeled off, an optical anisotropy layer formed of a liquid crystal was formed on a prepared film, a polarizing film was stacked thereon, and the resultant stack was bonded with an adhesive such that the optical anisotropy layer of the prepared film was placed on the panel side, to obtain a liquid crystal panel. A display screen of the above liquid crystal panel during reflection was evaluated for a contrast and determined as ○, Δ or X in the order of from being good to being poor.

Example 1

<Production of Copolycarbonate>

72.32 Parts of isosorbide (to be abbreviated as "ISS" hereinafter), 80.24 parts of 9,9-bis(4-hydroxy-3-methylphenyl)fluorene (to be abbreviated as "BCF" hereinafter), 154.61 parts of diphenyl carbonate and $1.8 \times 10^{-2}$ part of tetramethylammonium hydroxide and $1.6 \times 10^{-4}$ part of sodium hydroxide as catalysts were heated and melted at 180° C. under nitrogen atmosphere. Then, the degree of reduced pressure was adjusted to 13.4 kPa over 30 minutes. Then, the temperature was elevated to 260° C. at a rate of 60° C./hour, and it was maintained at this temperature for 10 minutes. Then, the degree of reduced pressure was adjusted to 133 Pa or lower over a period of 1 hour. The reaction was carried out with stirring for a total time period of 6 hours.

After completion of the reaction, dodecylbenzenesulfonic acid tetrabutylphosphonium salt having a molar amount 4 times the catalyst amount was added to deactivate the catalysts, and a reaction product was discharged from the bottom of the reactor under elevated pressure by nitrogen and cut with a pelletizer while it was cooled in a water vessel, to give pellets. The resultant pellets had a viscosity average molecular weight of 19,600. A compositional ratio was measured on the basis of NMR. The composition ratio was BCF/ISS=29.8/70.2, and the deviation thereof from the charged amount ratio was as small as 0.2.

<Production of Optical Film>

Then, a T-die having a lip width of 500 μm and a film take-up apparatus were attached to a 15 mmϕ twin-screw extruder supplied by TECHNOVEL CORPORATION, and the obtained copolycarbonate was molded into a film to obtain a transparent extrusion film. A sample having a size of 50 mm×10 mm was taken from a central portion having a thickness of 68±0.8 μm in the obtained film, and the sample was measured for a photoelastic constant and a Tg. Further, a 100 mm long and 70 mm wide sample taken in the same manner was monoaxially stretched 2.0 times in the length direction at 196° C. (Tg+10° C.) to give a stretched film having a length of 200 mm, a width of 56 mm and a thickness of 49 μm. The stretched film was measured for a retardation and chromatic dispersion. Further, the contrast evaluation was carried out. The deviation of the compositional ratio from the charged amount ratio was as small as 0.2, and the chromatic dispersion was hence not affected. Table 1 shows the results.

Example 2

<Production of Copolycarbonate>

An aromatic-aliphatic copolycarbonate was obtained in the same manner as in Example 1 except that 68.19 parts of ISS, 90.94 parts of BCF and 154.61 parts of diphenyl carbonate were used. The thus-obtained pellets had a viscosity average molecular weight of 19,200. Its compositional ratio was measured on the basis of NMR. The compositional ratio was BCF/ISS=33.7/67.3, and the deviation thereof from the charged amount ratio was as small as 0.3.

<Production of Optical Film>

The copolycarbonate was dissolved in methylene chloride to prepare a dope having a solid content of 19% by weight. A cast film (thickness 68±0.8 μm) was formed from the dope by a known method. A sample having a size of 50 mm×10 mm was taken from a 80±0.8 μm thick portion in the vicinity of the center of the thus-obtained film, and the sample was evaluated for a photoelastic coefficient and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 48 μm. Since the deviation of the compositional ratio from the charged amount ratio was as small as 0.2, the chromatic dispersion was not affected. The stretched film was measured for a retardation and chromatic dispersion in the same manner as in Example 1. Further, the contrast evaluation was also carried out. Table 1 shows the results.

Example 3

<Production of Copolycarbonate>

An aromatic-aliphatic copolycarbonate was obtained in the same manner as in Example 1 except that 72.32 parts of ISS, 93.09 parts of 9,9-bis[4-(2-hydroxyethoxy)phenyl]fluorene (to be abbreviated as "BPEF" hereinafter) and 154.61 parts of diphenyl carbonate were used. The thus-obtained pellets had a viscosity average molecular weight of 19,600. Its compositional ratio was measured on the basis of NMR. The compositional ratio was BPEF/ISS=29.8/70.2, and the deviation thereof from the charged amount ratio was as small as 0.2.

<Production of Optical Film>

A film (thickness 83±0.8 μm) was prepared in the same manner as in Example 1. The obtained film was evaluated for a photoelastic constant and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 64 μm. The stretched film was measured for a retardation and chromatic dispersion. Further, the contrast evaluation was also carried out. Since the deviation of the compositional ratio from the charged amount ratio was as small as 0.2, the chromatic dispersion was not affected. Table 1 shows the results.

Example 4

<Production of Copolycarbonate>

An aromatic-aliphatic copolycarbonate was obtained in the same manner as in Example 1 except that 61.99 parts of ISS, 124.12 parts of BPEF 154.61 parts of diphenyl carbonate were used. The thus-obtained pellets had a viscosity average molecular weight of 19,400. Its compositional ratio was measured on the basis of NMR. The compositional ratio was BPEF/ISS=39.8/60.2, and the deviation thereof from the charged amount ratio was as small as 0.2.

<Production of Optical Film>

A film (thickness 84±0.8 μm) was prepared in the same manner as in Example 1. The obtained film was evaluated for a photoelastic constant and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 64 μm. The stretched film was measured for a retardation and chromatic dispersion. Further, the contrast evaluation was also carried out. Since the deviation of the compositional ratio from the charged amount ratio was as small as 0.2, the chromatic dispersion was not affected. Table 1 shows the results.

Example 5

<Production of Copolycarbonate>

An aromatic-aliphatic copolycarbonate was obtained in the same manner as in Example 1 except that 51.66 parts of ISS, 155.15 parts of BPEF and 154.61 parts of diphenyl carbonate were used. The thus-obtained pellets had a viscosity average molecular weight of 19,000. Its compositional ratio was measured on the basis of NMR. The compositional ratio was BPEF/ISS=49.8/50.2, and the deviation thereof from the charged amount ratio was as small as 0.2.

<Production of Optical Film>

A film (thickness 82±0.8 μm) was prepared in the same manner as in Example 1. The obtained film was evaluated for a photoelastic constant and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 62 μm. The stretched film was measured for a retardation and chromatic dispersion. Further, the contrast evaluation was also carried out. Since the deviation of the compositional ratio from the charged amount ratio was as small as 0.2, the chromatic dispersion was not affected. Table 1 shows the results.

Example 6

<Production of Copolycarbonate>

An aromatic-aliphatic copolycarbonate was obtained in the same manner as in Example 1 except that 41.33 parts of ISS, 186.18 parts of BPEF and 154.61 parts of diphenyl carbonate were used. The thus-obtained pellets had a viscosity average molecular weight of 19,200. Its compositional ratio was measured on the basis of NMR. The compositional ratio was BPEF/ISS=59.7/40.3, and the deviation thereof from the charged amount ratio was as small as 0.3.

<Production of Optical Film>

A film (thickness 83±0.8 μm) was prepared in the same manner as in Example 1. The obtained film was evaluated for a photoelastic constant and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 63 μm. The stretched film was measured for a retardation and chromatic dispersion. Further, the contrast evaluation was also carried out. Since the deviation of the compositional ratio from the charged amount ratio was as small as 0.3, the chromatic dispersion was not affected. Table 1 shows the results.

Example 7

<Production of Copolycarbonate>

An aromatic-aliphatic copolycarbonate was obtained in the same manner as in Example 1 except that 51.66 parts of ISS, 133.74 parts of BCF and 154.61 parts of diphenyl carbonate were used. The thus-obtained pellets had a viscosity average molecular weight of 18,900.

<Production of Optical Film>

The copolycarbonate was dissolved in methylene chloride to prepare a dope having a solid content of 19% by weight. A cast film (thickness 81±0.8 μm) was formed from the dope by a known method. The thus-obtained film was evaluated for a photoelastic coefficient and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 62 μm. The stretched film was measured for a retardation and chromatic dispersion in the same manner as in Example 1. Table 2 shows the results.

Example 8

<Production of Copolycarbonate>

An aromatic-aliphatic copolycarbonate was obtained in the same manner as in Example 1 except that 30.99 parts of ISS, 217.21 parts of BPEF and 154.61 parts of diphenyl carbonate were used. The thus-obtained pellets had a viscosity average molecular weight of 19,000.

<Production of Optical Film>

A film (thickness 83±0.8 μm) was formed in the same manner as in Example 1. The thus-obtained film was evaluated for a photoelastic coefficient and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 63 μm. The stretched film was measured for a retardation and chromatic dispersion. Table 2 shows the results.

Example 9

<Production of Copolycarbonate>

An aromatic-aliphatic copolycarbonate was obtained in the same manner as in Example 1 except that 20.66 parts of ISS, 248.24 parts of BPEF and 154.61 parts of diphenyl carbonate were used. The thus-obtained pellets had a viscosity average molecular weight of 19,200.

<Production of Optical Film>

A film (thickness 81±0.8 μm) was formed in the same manner as in Example 1. The thus-obtained film was evaluated for a photoelastic coefficient and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 62 μm. The stretched film was measured for a retardation and chromatic dispersion. Table 2 shows the results.

Example 10

<Production of Copolycarbonate>

An aromatic-aliphatic copolycarbonate was obtained in the same manner as in Example 1 except that 15.5 parts of ISS, 227.36 parts of BCF and 154.61 parts of diphenyl carbonate were used. The thus-obtained pellets had a viscosity average molecular weight of 16,500.

<Production of Optical Film>

The copolycarbonate was dissolved in methylene chloride to prepare a dope having a solid content of 19% by weight. A cast film (thickness 80±0.8 μm) was formed from the dope by a known method. The thus-obtained film was evaluated for a photoelastic coefficient and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 63 μm. The stretched film was measured for a retardation and chromatic dispersion. Table 3 shows the results.

Example 11

<Production of Copolycarbonate>

An aromatic-aliphatic copolycarbonate was obtained in the same manner as in Example 1 except that 10.33 parts of ISS, 279.27 parts of BPEF and 154.61 parts of diphenyl carbonate were used. The thus-obtained pellets had a viscosity average molecular weight of 19,200.

<Production of Optical Film>

A film (thickness 85±0.8 μm) was formed in the same manner as in Example 1. The thus-obtained film was evaluated for a photoelastic coefficient and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 65 μm. The stretched film was measured for a retardation and chromatic dispersion. Table 3 shows the results.

Comparative Example 1

<Production of Aromatic Polycarbonate>

A reactor having a thermometer, a stirrer and a reflux condenser was charged with 9,809 parts of deionized water and 2,271 parts of a 48% sodium hydroxide aqueous solution, 1,775 parts of 2,2-bis(4-hydroxyphenyl)propane (BPA) and 3.5 parts of sodium hydrosulfite were dissolved therein, 7,925 parts of methylene chloride was added, and then 1,000 parts of phosgene was blown into it with stirring at 16 to 20° C. over a period of 60 minutes. After completion of the blowing of the phosgene, 52.6 parts of p-tert-butylphenol and 327 parts of a 48% sodium hydroxide aqueous solution were added, 1.57 parts of triethylamine was added, and the mixture was stirred at 20 to 27° C. for 40 minutes to complete the reaction. A methylene chloride layer containing a formed product was washed with dilute hydrochloric acid and pure water, and then methylene chloride was evaporated off to give an aromatic polycarbonate. The resultant powder had a viscosity average molecular weight of 15,500.

<Production of Optical Film>

The thus-obtained aromatic polycarbonate was pelletized with a 15 mmϕ twin-screw extruder. Then, a film (thickness 58±0.8 μm) was formed in the same manner as in Example 1. The obtained film was evaluated for a photoelastic constant and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 56 mm and a thickness of 41 μm. The stretched film was measured for a retardation and chromatic dispersion. Tables 1 and 2 show the results. Further, the contrast evaluation was carried out. Tables 1 and 2 show the results. This film had a high photoelastic constant of $80\times10^{-12}$ $Pa^{-1}$, and had large birefringence caused by a stress. When the film is used as a retardation film, undesirably, a light omission hence takes place. Further, since the chromatic dispersion thereof is positive dispersion, λ/4 is not attainable in a broad band, and there is caused the problem of a color omission.

Comparative Example 2

<Production of Aromatic Copolycarbonate>

A reactor having a thermometer, a stirrer and a reflux condenser was charged with 9,809 parts of deionized water and 2,271 parts of a 48% sodium hydroxide aqueous solution, 585 parts of 2,2-bis(4-hydroxyphenyl)propane (BPA), 1,969 parts of 9,9-bis(4-hydroxy-3-methylphenyl)fluorene and 4.5 parts of sodium hydrosulfite were dissolved therein, 6,604 parts of methylene chloride was added, and then 1,000 parts of phosgene was blown into it with stirring at 16 to 20° C. over a period of 60 minutes. After completion of the blowing of the phosgene, 70 parts of p-tert-butylphenol and 327 parts of a 48% sodium hydroxide aqueous solution were added, 1.57 parts of triethylamine was further added, and the mixture was stirred at 20 to 27° C. for 40 minutes to complete the reaction. A methylene chloride layer containing a formed product was washed with dilute hydrochloric acid and pure water, and then methylene chloride was evaporated off to give an aromatic copolycarbonate having a fluorene structure. The resultant powder had a viscosity average molecular weight of 38,200. Its compositional ratio was measured on the basis of NMR. The compositional ratio was BPA/BCF=32.8/67.2, and the deviation thereof from the charged amount ratio was as small as 0.2.

<Production of Optical Film>

A film (thickness 141±0.8 μm) was formed in the same manner as in Example 2. The obtained film was evaluated for a photoelastic constant and a Tg in the same manner as in Example 1. A film taken in the same manner as in Example 1 was monoaxially stretched 2.0 times at Tg+10° C. in the same manner as in Example 1 to obtain a stretched film having a length of 200 mm, a width of 56 mm and a thickness of 100 μm. The stretched film was measured for a retardation and chromatic dispersion. Further, the contrast evaluation was carried out. Since the deviation of the compositional ratio from the charged amount ratio was as small as 0.2, the chromatic dispersion was not affected. Table 1 shows the results. This film had a high photoelastic constant of $44\times10^{-12}$ $Pa^{-1}$, and had large birefringence caused by a stress. When the film is used as a retardation film, undesirably, a light omission hence takes place.

Comparative Example 3

<Production of Copolycarbonate>

A copolycarbonate was obtained in the same manner as in Example 1 except that 7.67 parts of ISS, 24.2 parts of spiroglycol (to be abbreviated as SPG hereinafter), 6.81 parts of BCF and 32.45 parts of diphenyl carbonate were used. The thus-obtained pellets had a viscosity average molecular weight of 16,300. Its compositional ratio was measured on the basis of NMR. The compositional ratio thereof was ISS/SPG/BCF=34.6/52.6/12.8, and the deviation thereof from the charged amount ratio was as large as 0.8.

<Production of Optical Film>

A film (thickness 78±0.8 μm) was formed in the same manner as in Example 1. The obtained film was evaluated for a photoelastic constant in the same manner as in Example 1. A film taken in the same manner as in Example 1 was monoaxially stretched 2.0 times at Tg+10° C. in the same manner as in Example 1 to obtain a stretched film having a length of 200 mm, a width of 57 mm and a thickness of 48 μm. The stretched film was measured for a retardation and chromatic dispersion. Further, the contrast evaluation was carried out. Since the deviation of the compositional ratio from the charged amount ratio was as large as 0.8, it was difficult to control the chromatic dispersion. Table 1 shows the results.

Comparative Example 4

<Production of Aromatic Copolycarbonate>

A reactor having a thermometer, a stirrer and a reflux condenser was charged with 9,809 parts of deionized water and 2,271 parts of a 48 sodium hydroxide aqueous solution, 461 parts of 2,2-bis(4-hydroxyphenyl)propane (BPA), 2,175 parts of 9,9-bis(4-hydroxy-3-methylphenyl)fluorene and 4.5 parts of sodium hydrosulfite were dissolved therein, 6,404 parts of methylene chloride was added, and then 1,000 parts of phosgene was blown into it with stirring at 16 to 20° C. over a period of 60 minutes. After completion of the blowing of the phosgene, 70 parts of p-tert-butylphenol and 327 parts of a 48% sodium hydroxide aqueous solution were added, 1.57 parts of triethylamine was further added, and the mixture was stirred at 20 to 27° C. for 40 minutes to complete the reaction. A methylene chloride layer containing a formed product was washed with dilute hydrochloric acid and pure water, and then methylene chloride was evaporated off to give an aromatic copolycarbonate having a fluorene structure. Its compositional ratio was measured on the basis of NMR. The resultant powder had a viscosity average molecular weight of 38,200.

<Production of Optical Film>

A film (thickness 164±0.8 μm) was formed in the same manner as in Example 2. The obtained film was evaluated for a photoelastic constant in the same manner as in Example 1. A film taken in the same manner as in Example 1 was monoaxially stretched 2.0 times at Tg+10° C. in the same manner as in Example 1 to obtain a stretched film having a length of 200 mm, a width of 56 mm and a thickness of 100 μm. The stretched film was measured for a retardation and chromatic dispersion. Table 2 shows the results. This film had a high photoelastic constant of $42\times10^{-12}$ $Pa^{-1}$, and had large birefringence caused by a stress. When the film is used as a retardation film, undesirably, a light omission hence takes place.

Comparative Example 5

<Production of Copolycarbonate>

A reactor having a thermometer, a stirrer and a reflux condenser was charged with 9,809 parts of deionized water and 2,271 parts of a 48% sodium hydroxide aqueous solution, 337 parts of 2,2-bis(4-hydroxyphenyl)propane (BPA), 2,280 parts of 9,9-bis(4-hydroxy-3-methylphenyl)fluorene and 4.5 parts of sodium hydrosulfite were dissolved therein, 6,404 parts of methylene chloride was added, and then 1,000 parts of phosgene was blown into it with stirring at 16 to 20° C. over a period of 60 minutes. After completion of the blowing of the phosgene, 70 parts of p-tert-butylphenol and 327 parts of a 48% sodium hydroxide aqueous solution were added, 1.57 parts of triethylamine was further added, and the mixture was stirred at 20 to 27° C. for 40 minutes to complete the reaction. A methylene chloride layer containing a formed product was washed with dilute hydrochloric acid and pure water, and then methylene chloride was evaporated off to give an aromatic copolycarbonate having a fluorene structure. Its compositional ratio was measured on the basis of NMR.

<Production of Optical Film>

A film (thickness 164±0.8 μm) was formed in the same manner as in Example 2. The obtained film was evaluated for a photoelastic constant in the same manner as in Example 1. A film taken in the same manner as in Example 1 was monoaxially stretched 2.0 times at Tg+10° C. in the same manner as in Example 1 to obtain a stretched film having a length of 200 mm, a width of 56 mm and a thickness of 100 μm. The stretched film was measured for a retardation and chromatic dispersion. Table 3 shows the results. This film had a high photoelastic constant of $38 \times 10^{-12}$ $Pa^{-1}$, and had large birefringence caused by a stress. When the film is used as a retardation film, undesirably, a light omission hence takes place.

TABLE 1

|  | BCF mol % | BPEF mol % | ISS mol % | BPA mol % | SPG mol % | Tg °C. | P(550) nm | R(450)/R(550) | R(650)/R(550) |
|---|---|---|---|---|---|---|---|---|---|
| Example 1 | 30 | — | 70 | — | — | 186 | 195 | 0.896 | 1.041 |
| Example 2 | 34 | — | 66 | — | — | 189 | 179 | 0.838 | 1.081 |
| Example 3 | — | 30 | 70 | — | — | 159 | 195 | 0.984 | 1.012 |
| Example 4 | — | 40 | 60 | — | — | 158 | 153 | 0.906 | 1.035 |
| Example 5 | — | 50 | 50 | — | — | 157 | 140 | 0.835 | 1.070 |
| Example 6 | — | 60 | 40 | — | — | 156 | 124 | 0.706 | 1.090 |
| Comparative Example 1 | — | — | — | 100 | — | 148 | 248 | 1.080 | 0.970 |
| Comparative Example 2 | 67 | — | — | 33 | — | 225 | 178 | 0.810 | 1.070 |
| Comparative Example 3 | 12 | — | 35 | — | 53 | 138 | 132 | 0.946 | 1.014 |

|  | Photoelastic constant $10^{-12}$ Pa | $\Delta$n | Viscosity average molecular weight | Difference between BCF charged amount ratio and compositional ratio | Film forming method | Contrast evaluation |
|---|---|---|---|---|---|---|
| Example 1 | 19 | 0.0040 | 19600 | 0.2 | Melt film forming method | ○ |
| Example 2 | 20 | 0.0037 | 19200 | 0.3 | Casting method | ○ |
| Example 3 | 19 | 0.0030 | 19600 | 0.2 | Melt film forming method | ○ |
| Example 4 | 21 | 0.0024 | 19400 | 0.2 | Melt film forming method | ○ |
| Example 5 | 23 | 0.0023 | 19000 | 0.2 | Melt film forming method | ○ |
| Example 6 | 25 | 0.0025 | 19200 | 0.3 | Melt film forming method | ○ |
| Comparative Example 1 | 80 | 0.0060 | 15500 | — | Melt film forming method | X |
| Comparative Example 2 | 44 | 0.0018 | 38200 | 0.2 | Casting method | ○ |
| Comparative Example 3 | 13 | 0.0028 | 16300 | 0.8 | Melt film forming method | Δ |

TABLE 2

| | BCF mol % | BPEF mol % | ISS mol % | BPA mol % | Tg °C. | Photoelastic constant $10^{-12} Pa^{-1}$ | R(450) nm | R(550) nm | R(650) nm | Viscosity average molecular weight | Film forming method |
|---|---|---|---|---|---|---|---|---|---|---|---|
| Example 7 | 50 | — | 50 | — | 199 | 22 | −3 | 5 | 8 | 18900 | Casting method |
| Example 8 | — | 70 | 30 | — | 155 | 27 | −8 | 0 | 3 | 19000 | Melt film forming method |
| Example 9 | — | 80 | 20 | — | 154 | 28 | −11 | −3 | 1 | 19200 | Melt film forming method |
| Comparative Example 1 | — | — | — | 100 | 148 | 80 | 268 | 248 | 241 | 15500 | Melt film forming method |
| Comparative Example 4 | 74 | — | — | 26 | 234 | 42 | −44 | 0 | 16 | 38200 | Casting method |

TABLE 3

| | BCF mol % | BPEF mol % | ISS mol % | BPA mol % | Photoelastic constant $10^{-12} Pa^{-1}$ | R(450) nm | R(550) nm | R(650) nm | Viscosity average molecular weight | Δn | Film forming method |
|---|---|---|---|---|---|---|---|---|---|---|---|
| Example 10 | 85 | — | 15 | — | 28 | −181 | −141 | −131 | 16500 | −0.0022 | Casting method |
| Example 11 | — | 90 | 10 | — | 29 | −104 | −71 | −58 | 19200 | −0.0011 | Melt film forming method |
| Comparative Example 5 | 81 | — | — | 19 | 38 | −118 | −100 | −95 | 35200 | −0.0010 | Casting method |

Referential Example 1

<Production of Aliphatic Polycarbonate>

103.31 Parts of cyclohexanedimethanol (to be abbreviated as CHDM hereinafter), 154.61 parts of diphenyl carbonate and $1.8 \times 10^{-2}$ part of tetramethylammonium hydroxide and $1.6 \times 10^{-4}$ part of sodium hydroxide as catalysts were heated to 180° C. under nitrogen atmosphere to melt them. Then, the degree of reduced pressure was adjusted to 13.4 kPa over a period of 30 minutes. Then, the temperature was increased up to 240° C. at a rate of 60° C./hour, this temperature was maintained for 10 minutes, and then the degree of reduced pressure was adjusted to 133 Pa or lower over a period of 1 hour. The reaction was carried out with stirring for a total time period of 6 hours.

After completion of the reaction, dodecylbenzenesulfonic acid tetrabutylphosphonium salt in an amount 4 times the catalyst amount was added to deactivate the catalysts, then, a reaction product was discharged from the bottom of the reaction vessel under nitrogen pressure and cut with a pelletizer with cooling it in a water vessel to give pellets.

<Production of Optical Film>

Then, a T-die having a lip width of 500 μm and a film take-up apparatus were attached to a 15 mmϕ twin-screw extruder supplied by TECHNOVEL CORPORATION, and the obtained copolycarbonate was molded into a film to obtain a transparent extrusion film. A sample that was taken from a central portion of the obtained film was measured for a photoelastic constant and a viscosity average molecular weight. Further, a sample that was taken in the same manner was monoaxially stretched 2.0 times in the length direction at 51° C. (Tg+10° C.) to give a stretched film. The stretched film was measured for a retardation and chromatic dispersion. Table 4 shows the results.

Referential Example 2

<Production of Aliphatic Polycarbonate>

An aliphatic polycarbonate was obtained in the same manner as in Referential Example 1 except that 138.9 parts of tricyclo[5.2.1.0.2,6]decanedimethanol (to be abbreviated as CDDM hereinafter) and 154.61 parts of diphenyl carbonate were used.

<Production of Optical Film>

Then, a film was formed in the same manner as in Referential Example 1 and measured for a photoelastic constant and a viscosity average molecular weight. Further, a sample that was taken in the same manner as in Referential Example 1 was monoaxially stretched 2.0 times at Tg+10° C. in the same manner as in Referential Example 1, and the thus-obtained film was measured for a retardation and chromatic dispersion. Table 4 shows the results.

Referential Example 3

<Production of Aliphatic Polycarbonate>

An aliphatic polycarbonate was obtained in the same manner as in Referential Example 1 except that 154.47 parts of dioxane glycol (to be abbreviated as DOG hereinafter) and 154.61 parts of diphenyl carbonate were used.

<Production of Optical Film>

Then, a film was formed in the same manner as in Referential Example 1 and measured for a photoelastic constant and a viscosity average molecular weight. Further, a sample that was taken in the same manner as in Referential Example 1 was monoaxially stretched 2.0 times at Tg+10° C. in the same manner as in Referential Example 1, and the thus-obtained film was measured for a retardation and chromatic dispersion. Table 4 shows the results.

Referential Example 4

<Production of Aliphatic Polycarbonate>
An aliphatic polycarbonate was obtained in the same manner as in Referential Example 1 except that 161.55 parts of bisphenol A (to be abbreviated as BPA hereinafter) and 154.61 parts of diphenyl carbonate were used.
<Production of Optical Film>
Then, a film was formed in the same manner as in Referential Example 1 and measured for a photoelastic constant and a viscosity average molecular weight. Further, a sample that was taken in the same manner as in Referential Example 1 was monoaxially stretched 2.0 times at Tg+10° C. in the same manner as in Referential Example 1, and the thus-obtained film was measured for a retardation and chromatic dispersion. Table 4 shows the results.

Referential Example 5

<Production of Aromatic Polycarbonate>
A reactor having a thermometer, a stirrer and a reflux condenser was charged with 9,809 parts of deionized water and 2,271 parts of a 48% sodium hydroxide aqueous solution, 2,939 parts of 9,9-bis(4-hydroxy-3-methylphenyl)fluorene (to be abbreviated as BCF hereinafter) and 4.5 parts of sodium hydrosulfite were dissolved therein, 6,604 parts of chloroform was added, and then 1,000 parts of phosgene was blown into it with stirring at 16 to 20° C. over a period of 60 minutes. After completion of the blowing of the phosgene, 70 parts of p-tert-butylphenol and 327 parts of a 48% sodium hydroxide aqueous solution were added, 1.57 parts of triethylamine was further added, and the mixture was stirred at 20 to 27° C. for 40 minutes to complete the reaction. A methylene chloride layer containing a formed product was washed with dilute hydrochloric acid and pure water, and then methylene chloride was evaporated off to give an aromatic polycarbonate.
<Production of Optical Film>
The copolycarbonate was dissolved in methylene chloride to prepare a dope having a solid content of 19% by weight. A cast film was formed from the dope by a known method. A sample that was taken from a central portion of the thus-obtained film was evaluated for a photoelastic coefficient, a viscosity average molecular weight and a Tg in the same manner as in Referential Example 1. Further, a film taken in the same manner as in Referential Example 1 was monoaxially stretched 2.0 times at Tg+10° C. in the same manner as in Referential Example 1, and the thus-obtained stretched film was measured for a retardation and chromatic dispersion in the same manner as in Referential Example 1. Table 4 shows the results.

Referential Example 6

<Production of Aromatic Polycarbonate>
An aromatic polycarbonate was obtained in the same manner as in Referential Example 1 except that 310.3 parts of 9,9-bis[4-(2-hydroxyethoxy)phenyl]fluorene (to be abbreviated as BPEF hereinafter) and 154.61 parts of diphenyl carbonate were used.

<Production of Optical Film>
Then, a film was formed in the same manner as in Referential Example 1 and measured for a photoelastic constant and a viscosity average molecular weight. Further, a sample that was taken in the same manner as in Referential Example 1 was monoaxially stretched 2.0 times at Tg+10° C. in the same manner as in Referential Example 1, and the thus-obtained film was measured for a retardation and chromatic dispersion. Table 4 shows the results.

Example 12

<Production of Copolycarbonate>
67.35 Parts of CHDM, 90.94 parts of BCF and 154.61 parts of diphenyl carbonate and $1.8 \times 10^{-2}$ part of tetramethylammonium hydroxide and $1.6 \times 10^{-4}$ part of sodium hydroxide as catalysts were heated to 180° C. under nitrogen atmosphere to melt them. Then, the degree of reduced pressure was adjusted to 13.4 kPa over a period of 30 minutes. Then, the temperature was increased up to 260° C. at a rate of 60° C./hour, this temperature was maintained for 10 minutes, and then the degree of reduced pressure was adjusted to 133 Pa or lower over a period of 1 hour. The reaction was carried out with stirring for a total time period of 6 hours.

After completion of the reaction, dodecylbenzenesulfonic acid tetrabutylphosphonium salt in an amount 4 times the catalyst amount was added to deactivate the catalysts, then, a reaction product was discharged from the bottom of the reaction vessel under nitrogen pressure and cut with a pelletizer with cooling it in a water vessel to give pellets.
<Production of Optical Film>
Then, a T-die having a lip width of 500 μm and a film take-up apparatus were attached to a 15 mmφ twin-screw extruder supplied by TECHNOVEL CORPORATION, and the obtained copolycarbonate was molded into a film to obtain a transparent extrusion film. A sample that was taken from a central portion of the obtained film was measured for a photoelastic constant and a viscosity average molecular weight. Further, a sample that was taken in the same manner was monoaxially stretched 2.0 times in the length direction at 126° C. (Tg+10° C.) to give a stretched film. The stretched film was measured for a retardation and chromatic dispersion. Table 5 shows the results.

Example 13

<Production of Copolycarbonate>
A copolycarbonate was obtained in the same manner as in Example 12 except that 91.68 parts of TCDDM, 90.94 parts of BCF and 154.61 parts of diphenyl carbonate were used.
<Production of Optical Film>
Then, a film was formed in the same manner as in Example 12, and measured for a photoelastic constant and a viscosity average molecular weight. Further, a sample that was taken in the same manner as in Example 12 was monoaxially stretched 2.0 times at Tg+10° C. in the same manner as in Example 12, and the thus-obtained stretched film was measured for a retardation and chromatic dispersion. Table 5 shows the results.

Example 14

<Production of Copolycarbonate>
A copolycarbonate was obtained in the same manner as in Example 12 except that 69.45 parts of TCDDM, 155.15 parts of BPEF and 154.61 parts of diphenyl carbonate were used.

<Production of Optical Film>

Then, a film was formed in the same manner as in Example 12, and measured for a photoelastic constant and a viscosity average molecular weight. Further, a sample that was taken in the same manner as in Example 12 was monoaxially stretched 2.0 times at Tg+10° C. in the same manner as in Example 12, and the thus-obtained stretched film was measured for a retardation and chromatic dispersion. Table 5 shows the results.

Example 15

<Production of Copolycarbonate>

A copolycarbonate was obtained in the same manner as in Example 12 except that 101.95 parts of DOG, 90.94 parts of BCF and 154.61 parts of diphenyl carbonate were used.

<Production of Optical Film>

Then, a film was formed in the same manner as in Example 12, and measured for a photoelastic constant and a viscosity average molecular weight. Further, a sample that was taken in the same manner as in Example 12 was monoaxially stretched 2.0 times at Tg+10° C. in the same manner as in Example 12, and the thus-obtained stretched film was measured for a retardation and chromatic dispersion. Table 5 shows the results.

Comparative Example 6

<Production of Copolycarbonate>

A reactor having a thermometer, a stirrer and a reflux condenser was charged with 9,809 parts of deionized water and 2,271 parts of a 48% sodium hydroxide aqueous solution, 585 parts of BPA, 1,969 parts of BCF and 4.5 parts of sodium hydrosulfite dissolved therein, 6,604 parts of methylene chloride was added, and then 1,000 parts of phosgene was blown into it with stirring at 16 to 20° C. over a period of 60 minutes. After completion of the blowing of the phosgene, 70 parts of p-tert-butylphenol and 327 parts of a 48% sodium hydroxide aqueous solution were added, 1.57 parts of triethylamine was further added, and the mixture was stirred at 20 to 27° C. for 40 minutes to complete the reaction. A methylene chloride layer containing a formed product was washed with dilute hydrochloric acid and pure water, and then methylene chloride was evaporated off to give a copolycarbonate having a fluorene structure.

<Production of Optical Film>

The copolycarbonate was dissolved in methylene chloride to prepare a dope having a solid content of 19% by weight. A cast film was formed from the dope by a known method. A sample that was taken from a central portion of the thus-obtained film was evaluated for a photoelastic coefficient, a viscosity average molecular weight and a Tg in the same manner as in Referential Example 1. Further, a film taken in the same manner as in Referential Example 1 was monoaxially stretched 2.0 times at Tg+10° C. in the same manner as in Referential Example 1, and the thus-obtained stretched film was measured for a retardation and chromatic dispersion in the same manner as in Referential Example 1. Table 5 shows the results. This film had a high photoelastic constant of $42 \times 10^{-12}$ $Pa^{-1}$ and had large birefringence caused by stress. Further, its chromatic dispersion does not meet λ/4 in a short wavelength region, and there is caused a problem of a color omission, etc.

Comparative Example 7

<Production of Copolycarbonate>

A copolycarbonate was obtained in the same manner as in Comparative Example 6 except that 639 parts of BPA and 1,881 of BCF were used.

<Production of Optical Film>

Then, a film was formed in the same manner as in Comparative Example 6, and measured for a photoelastic constant and a viscosity average molecular weight. Further, a sample that was taken in the same manner as in Referential Example 1 was monoaxially stretched 2.0 times at Tg+10° C. in the same manner as in Referential Example 1, and the thus-obtained stretched film was measured for a retardation and chromatic dispersion. Table 5 shows the results. This film had a high photoelastic constant of $45 \times 10^{-12}$ $Pa^{-1}$ and had large birefringence caused by stress. When it is used as a retardation film, therefore, a light omission undesirably takes place. Further, its chromatic dispersion does not meet λ/4 in a long wavelength region, and there is caused a problem of a color omission, etc.

TABLE 4

| | Monomer | Viscosity average molecular weight | Tg ° C. | Photoelastic constant $10^{-12}$ $Pa^{-1}$ | R(550) nm | R(400)/ R(550) | R(700)/ R(550) |
|---|---|---|---|---|---|---|---|
| Referential Example 1 | CHDM | 18600 | 41 | 48 | 252 | 1.02 | 0.99 |
| Referential Example 2 | TCDDM | 18300 | 78 | 4 | 191 | 1.04 | 0.97 |
| Referential Example 3 | DOG | 19100 | 53 | 13 | 182 | 1.03 | 0.98 |
| Referential Example 4 | BPA | 16800 | 148 | 80 | 481 | 1.23 | 0.94 |
| Referential Example 5 | BCF | 19300 | 244 | 30 | −241 | 1.39 | 0.91 |
| Referential Example 6 | BPEF | 18800 | 153 | 35 | −112 | 1.55 | 0.83 |

TABLE 5

|  | Monomer | | Compositional ratio | | Viscosity average molecular weight | Tg | Photoelastic constant | R(550) | |
|---|---|---|---|---|---|---|---|---|---|
|  | Negative | Positive | Negative | Positive | — | °C. | $10^{-12}$ $Pa^{-1}$ | nm | $\Delta_n$ |
| Example 12 | BCF | CHDM | 34 | 66 | 19200 | 116 | 39 | 148 | 0.0039 |
| Example 13 | BCF | TCDDM | 34 | 66 | 19000 | 128 | 14 | 138 | 0.0039 |
| Example 14 | BPEF | TCDDM | 50 | 50 | 18800 | 115 | 20 | 131 | 0.0036 |
| Example 15 | BCF | DOG | 34 | 66 | 18900 | 118 | 18 | 139 | 0.0043 |
| Comparative Example 5 | BCF | BPA | 67 | 33 | 36400 | 225 | 42 | 141 | 0.0020 |
| Comparative Example 6 | BCF | BPA | 64 | 36 | 35900 | 220 | 45 | 148 | 0.0026 |

|  | R(400)/R(550) | R(450)/R(550) | R(650)/R(550) | R(700)/R(550) |
|---|---|---|---|---|
| Example 12 | 0.75 | 0.88 | 1.05 | 1.07 |
| Example 13 | 0.72 | 0.85 | 1.04 | 1.06 |
| Example 14 | 0.75 | 0.88 | 1.05 | 1.07 |
| Example 15 | 0.75 | 0.89 | 1.05 | 1.07 |
| Comparative Example 4 | 0.55 | 0.73 | 1.07 | 1.07 |
| Comparative Example 5 | 0.73 | 0.87 | 1.01 | 1.01 |

|  | \|R(400)/R(550)-400/550\| | \|R(700)/R(550)-700/550\| | \|R(400)/R(550)-400/550$\|^2$ + \|R(700)/R(550)-700/550$\|^2$ | Contrast evaluation |
|---|---|---|---|---|
| Example 12 | 0.02 | 0.20 | 0.0404 | ○ |
| Example 13 | 0.01 | 0.21 | 0.0442 | ○ |
| Example 14 | 0.02 | 0.20 | 0.0404 | ○ |
| Example 15 | 0.02 | 0.20 | 0.0404 | ○ |
| Comparative Example 4 | 0.18 | 0.20 | 0.0724 | X |
| Comparative Example 5 | 0 | 0.26 | 0.0676 | Δ |

EFFECT OF THE INVENTION

The retardation film of this invention is composed of a copolycarbonate having desired chromatic dispersion and a low photoelastic constant and having high-degree transparency and excellent processability, and it has desired chromatic dispersion owing to its stretching treatment and has capability of performing in a broad band in the form of a single layer, so that it is remarkably useful as a retardation film for a liquid crystal display and an organic EL display.

INDUSTRIAL UTILITY

The optical film of this invention is suitably used in an optical pickup for use in a liquid crystal display and a recording device, an optical device in an optical recording medium, a light emission device, an optical operation device, an optical communication device and a touch panel.

The invention claimed is:

1. An optical film which comprises a copolycarbonate comprising 25 mol % or more but less than 65 mol % of a unit (A4) represented by the following formula,

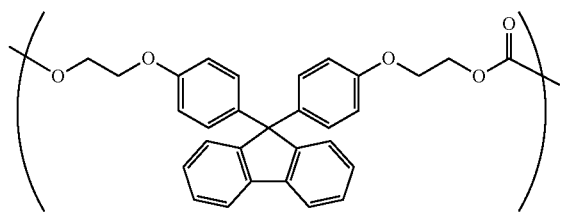

(A4)

and over 35 mol % but 75 mol % or less of a unit (B1) represented by the following formula,

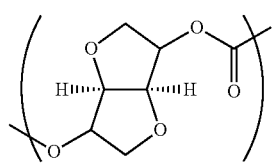

(B1)

wherein the optical film satisfies the following formulas (2) and (3), $$0 < R(450)/R(550) < 1 \quad (2)$$

$$1.01 < R(650)/R(550) < 2 \quad (3)$$

wherein R(450), R(550) and R(650) are film in-plane retardation values at wavelengths of 450 nm, 550 nm and 650 nm, respectively.

2. The optical film of claim 1, which satisfies the following formulas (8) to (10), $$|R(400)/R(550)-400/550| < 0.15 \quad (8)$$

$$|R(700)/R(550)-700/550| < 0.25 \quad (9)$$

$$|R(400)/R(550)-400/550|^2 + |R(700)/R(550)-700/550|^2 < 0.05 \quad (10)$$

wherein R(400), R(550) and R(700) are film in-plane retardation values at wavelengths of 400 nm, 550 nm and 700 nm, respectively.

3. The optical film of claim 1, which has a retardation exhibition capability ($\Delta$n) satisfying the following formula, $$0.3 > \Delta n > 0.002$$

($\Delta$n=R(550)(nm)/thickness (nm))

wherein R(550) is a film in-plane retardation value at a wavelength of 550 nm.

4. A retardation film comprising the optical film of claim 1.

5. A liquid crystal display comprising the retardation film of claim 4.

* * * * *